(12) United States Patent
Boudreau et al.

(10) Patent No.: US 10,844,913 B2
(45) Date of Patent: Nov. 24, 2020

(54) ELECTRIC HUB LOCK WITH MANUAL OVERRIDE

(71) Applicant: Warn Automotive, LLC, Milwaukie, OR (US)

(72) Inventors: Christopher Boudreau, Estacada, OR (US); Oliver B. Randall, Wilsonville, OR (US)

(73) Assignee: WARN AUTOMOTIVE, LLC, Milwaukie, OR (US)

( * ) Notice: Subject to any disclaimer, the term of this patent is extended or adjusted under 35 U.S.C. 154(b) by 224 days.

(21) Appl. No.: 16/014,709

(22) Filed: Jun. 21, 2018

(65) Prior Publication Data

US 2018/0372171 A1    Dec. 27, 2018

Related U.S. Application Data

(60) Provisional application No. 62/524,082, filed on Jun. 23, 2017.

(51) Int. Cl.
| | |
|---|---|
| *F16D 43/02* | (2006.01) |
| *F16D 11/14* | (2006.01) |
| *B60T 1/00* | (2006.01) |
| *B60T 1/10* | (2006.01) |
| *B60T 1/06* | (2006.01) |
| *F16D 61/00* | (2006.01) |
| *B61H 1/00* | (2006.01) |
| *F16D 63/00* | (2006.01) |

(52) U.S. Cl.
CPC .............. *F16D 43/02* (2013.01); *B60T 1/005* (2013.01); *B60T 1/062* (2013.01); *B60T 1/10* (2013.01); *B61H 1/00* (2013.01); *F16D 11/14* (2013.01); *F16D 61/00* (2013.01); *F16D 63/006* (2013.01)

(58) Field of Classification Search
CPC ........ F16D 11/04; F16D 43/02; F16D 63/006; F16D 61/00; B60K 17/3515; B60T 1/062; B60T 1/10; B60T 1/005; B61H 1/00
See application file for complete search history.

(56) References Cited

U.S. PATENT DOCUMENTS

| | | |
|---|---|---|
| 4,212,557 A | 7/1980 | Overbeek |
| 4,928,804 A | 5/1990 | Wakabayashi |
| 5,394,967 A | 3/1995 | Bigley |
| 5,445,258 A | 8/1995 | Bigley et al. |
| 5,520,272 A | 5/1996 | Ewer et al. |
| 5,535,869 A | 7/1996 | Bigley et al. |

(Continued)

FOREIGN PATENT DOCUMENTS

EP    0937585 A2    8/1999

OTHER PUBLICATIONS

ISA Korean Intellectual Property Office, International Search Report and Written Opinion Issued in Application No. PCT/US2018/038778, dated Oct. 29, 2018, WIPO, 14 pages.

*Primary Examiner* — Jacob S. Scott
*Assistant Examiner* — Lori Wu
(74) *Attorney, Agent, or Firm* — McCoy Russell LLP

(57) ABSTRACT

Methods and systems are provided for an automatic, electric hub lock with a manual override capability. In one example, the electric hub lock may be actuated responsive to one or more of a manipulation of a manual dial proximate a vehicle wheel and an electronic control inside a passenger compartment. In another example, a method includes overriding the automatic control of the hub lock responsive to manual request for operating the vehicle in four-wheel drive mode.

19 Claims, 15 Drawing Sheets

(56) References Cited

U.S. PATENT DOCUMENTS

| | | |
|---|---|---|
| 5,586,632 A | 12/1996 | Bigley et al. |
| 5,908,080 A | 6/1999 | Bigley et al. |
| 7,000,750 B2 | 2/2006 | Ewer |
| 7,055,667 B2 | 6/2006 | Roe et al. |
| 9,382,951 B2 | 7/2016 | Reiner et al. |
| 2011/0133542 A1 | 6/2011 | Ratti et al. |

ELECTRIC HUB LOCK WITH MANUAL OVERRIDE

CROSS REFERENCE TO RELATED APPLICATIONS

The present application claims priority to U.S. Provisional Application No. 62/524,082, entitled "ELECTRIC HUB LOCK WITH MANUAL OVERRIDE", and filed on Jun. 23, 2017. The entire contents of the above-listed application are hereby incorporated by reference for all purposes.

TECHNICAL FIELD

The invention relates to an electrically-controlled, automatic locking hub system for a vehicle with a manual override.

SUMMARY/BACKGROUND

Some vehicles employ four-wheel drive systems to increase traction for off-road driving as well as for on-road driving in low traction conditions. One example approach may provide optional engagement/disengagement of the four-wheel drive system to increase the versatility of the vehicle. Specifically, two of the drive wheels may be disengaged to provide two-wheel drive during on-road driving to increase the vehicle's fuel economy. On the other hand, four-wheel drive may be used to provide increased traction during certain driving conditions, such as vehicle operation on dirt roads, snow, etc. In this way, a user may adjust a vehicle's drivetrain based on the driving circumstances and the desired vehicle performance characteristics.

Four-wheel drive systems may be manually controlled (e.g., engaged and disengaged) by an operator who actuates a dial on the hub of each wheel. This may not be desirable in all instances, as some operators may not wish to exit the vehicle every time they wish to adjust the configuration of the four-wheel drive system. Automatic hub lock systems may automatically control whether the drivetrain is configured to a two-wheel drive mode or a four-wheel drive mode. Typical automatically controlled four-wheel drive systems may use vacuum motors to engage and disengage the four-wheel drive system.

While fully automatic engagement four-wheel drive systems offer benefits such as decreased user interaction, they may also have some drawbacks, such as greater manufacturing cost as well as repair and maintenance costs. The addition of associated components to control the four-wheel drive system, such as vacuum motors, may themselves degrade and put increased load on the engine. On the other hand, manually engaged four-wheel drive systems have certain benefits over automatically engaged system, such as increased reliability and decreased repair costs.

Thus in one example, the above issues associated with disconnect systems may be at least partially addressed by a hub lock, comprising: an electronically-controlled actuator adapted to engage and disengage a clutch ring and an inner drive gear of the hub lock; and a manually-adjustable input element adapted to override a disengaged configuration of the electronically-controlled actuator and engage the clutch ring and inner drive gear hub lock. In this way, it may be possible to combine the advantages of both a manual locking hub system and an automatic hub system. This may include an electrically-driven automatic four-wheel drive system with a manual override function. Such an approach may be desired by users who prefer ease-of-use in most conditions, but who wish to have the option to override the automatic system under certain operating conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-12 are shown approximately to scale.

DETAILED DESCRIPTION

The following detailed description relates to systems and methods for an electrically-controlled, automatic locking hub system for a vehicle with a manual override.

Figure 1:
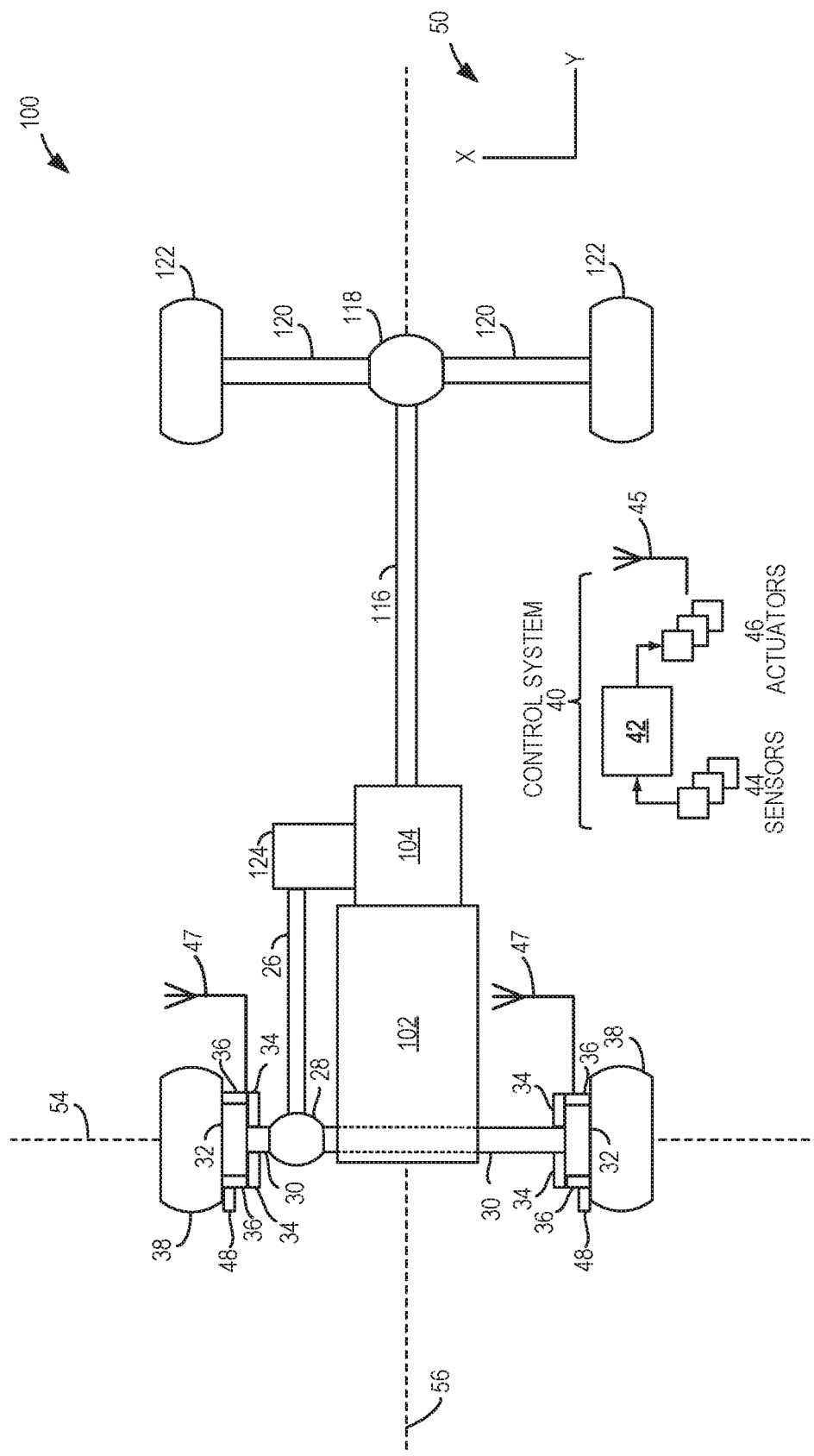
FIG. 1 shows a schematic depiction of a four-wheel drive vehicle including locking hub system for engaging/disengaging a portion of the drive wheels in the vehicle.

FIG. 1 shows a schematic illustration of a four-wheel drive vehicle 100. The vehicle 100 includes an internal combustion engine 102 configured to perform combustion cycles and generate a rotational output. The vehicle 100 further includes a transmission 104 coupled to the engine 102. The transmission 104 is configured to receive the rotational output from the engine 102, such as from a crankshaft (not shown). The vehicle 100 further includes a propeller shaft 116 coupled to the transmission 104 to receive rotational input therefrom. The propeller shaft 116 rotates a differential 118. In turn, the differential 118 rotates axles 120, each axle 120 coupled to a wheel 122 (e.g., rear wheels). Therefore, the propeller shaft 16 is coupled to the differential 118 and the differential is coupled to the axles 120. In some examples, axles 120 may be beam axles. The set of wheels 122 may be referred to as drive wheels.

The vehicle 100 further includes a transfer case 124 coupled to the transmission 104, the transfer case configured to receive rotational output from the transmission 104. Transfer case 124 rotates a second propeller shaft 26. The second propeller shaft 26 is coupled to a second differential 28 coupled to axles 30 and transfer rotational input thereto. In some examples, axles 30 may be beam axles. Each of the axles 30 are coupled to a locking hub system 32. Each of the locking hub systems 32 are rotationally coupled to the axles 30. The locking hub systems 32 are coupled to wheel bearings 34 and wheel attachment interfaces 36. In one example, a wheel attachment interface may be known as a hub. The vehicle 100 further includes wheels 38 coupled to each wheel attachment interface 36. The wheel bearings 34, wheel attachment interfaces 36, and wheels 38 may be included in a wheel assembly.

In some embodiments, wheel attachment interface 36 may include a hub-mounted energy generation and electrical storage system 48. The hub-mounted energy generation and electrical storage system 48 may include a generator and/or an energy storage device. In one example, the energy generation system may use "wasted" energy at or proximate the wheel attachment interface 36 to generate electricity and store the electricity in order to power the locking hub systems 32 that may be electrically actuated. This method of energy capture may operate using the same principles as regenerative braking systems where energy in the form of one or more of heat, rotation, and vertical translation (e.g., repeated movement up and down) may be converted to a storable energy form (via a generator or converter) and stored in an energy storage device, such as a battery, accumulator, or a capacitor. When a vehicle controller 42 sends a command to electrically actuate the locking hub system 32, energy from the energy storage device may be transferred directly to the locking hub system 32. In one embodiment, the energy may be conveyed from the energy storage device to the locking hub system 32 through wires or a wiring harness. Transmission of sensor feedback (such as from a mode sensor, as will be described below in reference to FIG. 7) and command signals conveyed between the vehicle controller 42 and the locking hub systems 32 may be communicated using wireless communication devices 45 and 47, respectively. In this way, the locking hub systems 32 and its energy source may be coupled to a rotating wheel attachment interface 36 without an electrical wire, or other physical connection, to the non-rotating vehicle.

The locking hub systems 32 are constructed to enable the wheels 38 to freely rotate in a disengaged configuration and constructed to enable rotational force to be transferred from the axles 30 to the wheels 38 in an engaged configuration. In this way, a second set of wheels, typically the front wheels, may be enabled and disabled as drive wheels, providing an optional two-wheel drive (e.g., disengaged) configuration and a four-wheel drive (e.g., engaged) configuration for operating the vehicle 100. It will be appreciated that the locking hub systems 32 may be configured to be one or more of automatically and manually actuated to adjust the wheels 38 into the engaged configuration and disengaged configuration.

Vehicle 100 further includes a control system 40. Control system 40 may include vehicle controller 42. Vehicle controller 42 may be configured to receive input from a plurality of vehicle sensors 44 in order to characterize a vehicle operating condition. Vehicle controller 42 may also be configured to send control commands (e.g., signals) to a plurality of actuators 46 of vehicle 100 in order control drivetrain operation. In one example, a user may indicate a request to change the configuration of a vehicle drivetrain from a two-wheel drive configuration to a four-wheel drive configuration. In one example, the request may include the user actuating a button, knob, or lever on a dashboard of vehicle 100 from a position indicating a two-wheel drive configuration to a position indicating four-wheel drive configuration. In some examples, the request may include the user making an electronic request by selecting a four-wheel drive mode option on a display panel of the vehicle. Responsive to the request to change the configuration of the drivetrain from a two-wheel drive configuration to a four-wheel drive configuration, vehicle controller 42 may send a signal to an actuator of each of the locking hub systems 32 in order to actuate internal components of the locking hub systems, as will be described in reference to subsequent Figures, causing the locking hub systems coupled to each wheel to engage. Once engaged, locking hub systems 32 may transfer torque from its respective axle 30 to its respective wheel 38. As a result, the vehicle 100 may be operated in a four-wheel drive mode.

Control system 40 may be coupled to a wireless communication device 45, which the controller 42 may use to communicate with a plurality of engine and vehicle components. In this way, the controller 42 may be connected to an external server and/or network cloud (not shown) via a wireless vehicle module, or wireless communication device 45. In this way, control commands may be sent to components of the vehicle and/or engine without a physical electrical connection (such as a wire) therebetween. In one example, a wireless communication device, or wireless EHL module 47 may also be coupled to each of the wheel attachment interfaces 36 such that the locking hub system 32 (e.g., electric hub lock) may be controlled (e.g., actuated) via wireless commands from the controller 42. Further, controller 42 may be configured to receive sensor output data (such as from a mode sensor coupled to the locking hub system, as will be discussed below in reference to FIG. 7) wirelessly.

A coordinate system 50 is shown in FIGS. 1-10 so that the orientation of disclosed embodiments may be clearly defined. A central vehicle axis 56 is oriented parallel with the y-axis of coordinate system 50, and a central rotational axis 54 coincides with the rotational axis of wheels 38. It will be appreciated that the central rotational axis 54 of the wheels 38 may coincide with the rotational axis of the locking hub systems 32. Central rotational axis 54 is oriented parallel with the x-axis of coordinate system 50. It will be appreciated that a z-axis is not shown on the coordinate system 50 of FIG. 1, as it is oriented in a direction that runs into and out of the page, perpendicular to both the x-axis and y-axis of coordinate system 50.

Figure 2:
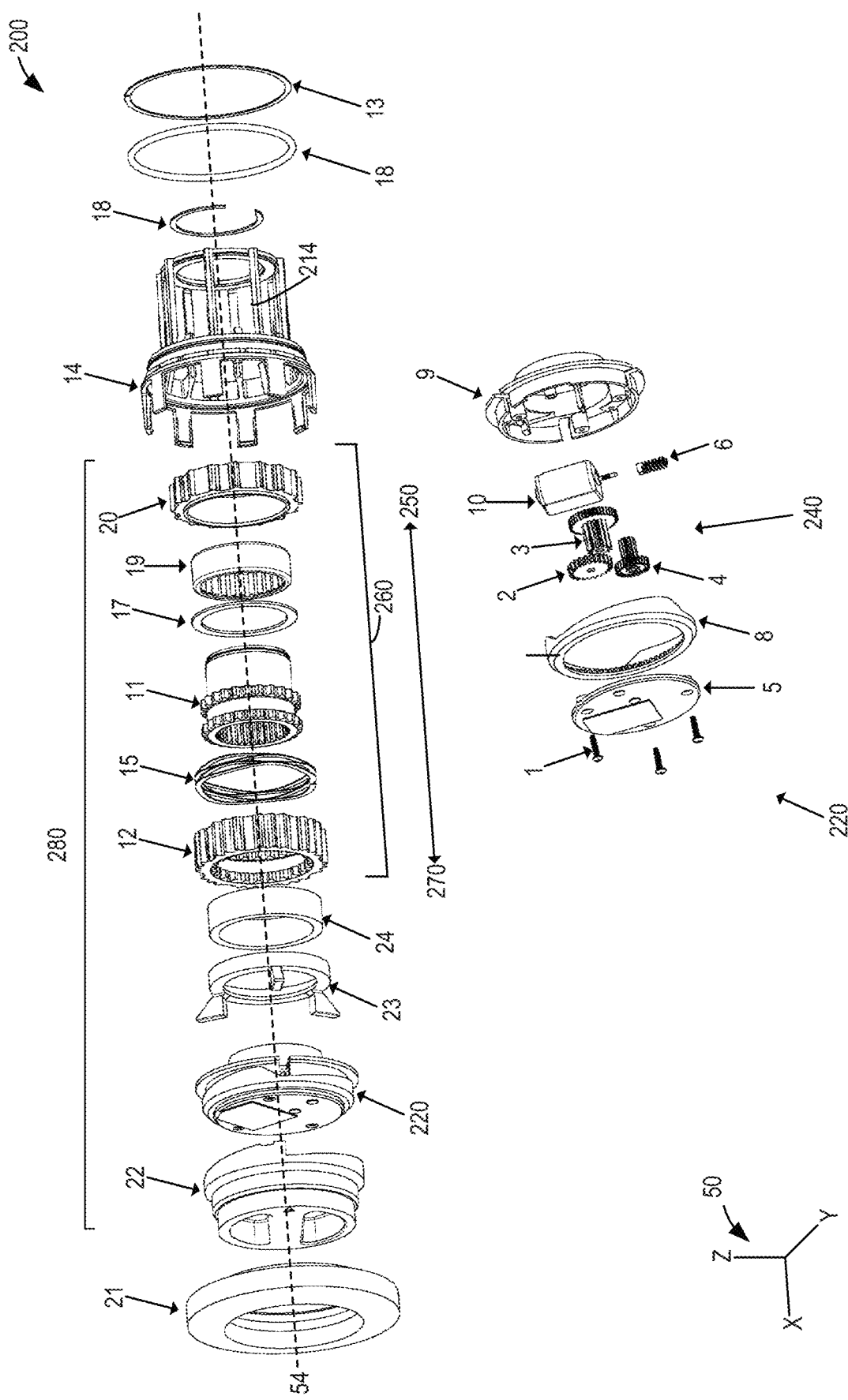
FIG. 2 shows an exploded view of an exemplary electric hub lock including an internal component set that includes an electric shift assembly.

FIG. 2 shows an exploded view of an exemplary locking hub system, referred to herein as an electric hub lock (EHL) 200. Coordinate system 50 is shown for reference, and central rotational axis 54 passes through the rotational axis of the EHL 200. Further, directions 250 and 270 are oriented parallel with both the x-axis and central rotational axis 54.

Planar surfaces and directions referred to as "outside" or "outer" may be associated with a surface facing direction 270, which is oriented toward the outside of the vehicle (e.g., away from central vehicle axis 56). In one example, central rotational axis 54 may be normal to the planar surfaces. Direction 270 is arranged perpendicular to the central vehicle axis 56 of the vehicle 100, as shown in FIG. 1. For example, cap 21 is considered outside manual dial 22 (and thus closer to the outside of the vehicle and further away from the central vehicle axis than the outside manual dial 22). Further, planar surfaces and directions referred to as "inside" or "inner" may be associated with a surface facing direction 250. For example, the inner surface of cam follower 23 faces the outer surface of block shift spring 24. It will be appreciated this applies to both wheel assemblies, as they may be approximately symmetric about central vehicle axis 56, as shown in FIG. 1.

It will be appreciated that each wheel 38 (shown in FIG. 1) may include an EHL 200 as described herein. In the depicted embodiment, the EHL 200 is an automatic-manual locking hub system designed for use in a vehicle that may be equipped with beam axles. The EHL 200 may be electrically (e.g., automatically) operated, and may also include a manually-adjustable input element that may have a manual override function wherein a user may force the EHL into the engaged configuration (e.g., four-wheel drive mode, 4×4 mode) by actuating the manually-adjustable input element. In one example, the manually-adjustable input element is a manual dial 22 coupled to the wheel 38. It will be appreciated that the EHL 200 may be utilized in the vehicle 100 shown in FIG. 1. Therefore, the EHL 200 is one non-limiting example of one of the locking hub systems 32 shown in FIG. 1.

In the depicted embodiment, the EHL 200 includes an outer cap 21. Outer cap 21 may include features that couple to cage 14, which will be described below in reference to FIG. 5. In this way, the internal components of the EHL 200 may be captured between the cap 21 and the cage 14, thereby retained and coupled to the wheel attachment interface 36. In other embodiments, outer cap 21 may be coupled to a wheel attachment interface with one or more screws or other suitable fastener. Annular grooves, or steps, on an internal surface of cap 21 may align and couple with complementary annual grooves, or steps, on manual dial 22. In this way, cap 21 may capture manual dial 22 and may also serve to shield manual dial 22 from debris and/or damage. Coupling of the outer cap 21 and manual dial 22 will be described further below with reference to FIG. 5. In some embodiments, a seal (not shown) may be used at a mating surface between the cap 21 and the manual dial 22.

Manual dial 22 may couple to an electronically-controlled actuator. In one example, the electronically-controlled actuator is an electric shift assembly 220. Specifically, an internal diameter of manual dial 22 may be larger than the external diameter of the electric shift assembly 220, allowing the electric shift assembly to be enveloped or nested partially within manual dial 22. Further details regarding the coupling of these two components will be discussed further below with reference to FIGS. 4-10. Continuing with FIG. 2, the manual dial 22 and the electric shift assembly 220 may contact an outer surface of a cam follower 23. An inner surface of cam follower 23 may contact an outer surface of a block shift spring 24. Further details regarding the coupling of these components will be discussed further below with reference to FIGS. 4-10. An inner surface of block shift spring 24 may contact an outer surface of clutch ring 12.

EHL 200 may include a clutch ring assembly 260. The clutch ring assembly 260 may include clutch ring 12, disengagement spring 15, inner drive gear 11, thrust washer 17, bearing 19, and bearing housing 20. The clutch ring assembly may be actuated into two configurations, an engaged configuration and a disengaged configuration. In the engaged configuration, inner splines of clutch ring 12, and the outer splines of the inner drive gear 11, which are configured to be coupleable with one another, are mated with one another to enable rotational input to be transferred from the inner drive gear to the clutch ring. As shown in FIG. 2, both the inner splines of clutch ring 12 and the outer splines of inner drive gear 11 may each be formed as two spline sets, each set separated by a space that includes no splines. In this way, components coupled to the inner drive gear and the clutch ring can jointly rotate. It will be appreciated that an axle (e.g., axle 30 of FIG. 1) is coupled to and provides the rotational input to the inner drive gear 11. As such, the rotational input from the axle coupled to the inner drive gear 11 may be transferred to the wheel 38 attached to the EHL 200 when the clutch ring is in the engaged configuration.

The disengaged configuration of the clutch ring assembly includes when the inner drive gear 11 is decoupled from the clutch ring 12. Specifically, a portion of the inner drive gear 11 is configured to freely and independently rotate with regard to a clutch ring 12. The engaged/disengaged configurations provides hub locking and unlocking functionality which enables four-wheel drive capabilities in the vehicle to be selectively enabled and disabled.

The clutch ring assembly 260 further includes a disengagement spring 15. The disengagement spring 15 is a wave spring in the depicted example. However, other types of springs have been contemplated. The clutch ring assembly 260 further includes a thrust washer 17 positioned between the inner drive gear 11 and a bearing 19 (e.g., roller bearing). The bearing 19 further includes an outer race (described below in reference to FIG. 4) which is positioned in and fixedly coupled to the bearing housing 20 when the clutch ring assembly 260 is assembled. The clutch ring assembly and other components described herein may be included inside cage 14. In the depicted example, cage 14 may be a plastic or composite material, although other materials have been contemplated. Further, cage 14 may include cage pins 214 that extend in a longitudinal direction, parallel with the x-axis. Specifically, as shown in FIG. 2, the cage pins 214 extend towards an interior of the EHL 200, in a direction of central rotational axis 54. A snap ring 18 may also be provided to retain the bearing 19 in the bearing housing 20. It will be appreciated that a user can easily remove the snap ring during servicing (e.g., cleaning and re-greasing), replacement, or repair of the locking hub system. Additional retaining rings 18 and 13 may be included between the cage and the wheel attachment interface 36. Further detail regarding the EHL 200 and operation of the clutch ring assembly 260 will be described below in reference to FIG. 4.

A subassembly 280 of the EHL 200 will be described in further detail below in reference to FIG. 4.

Figure 3:
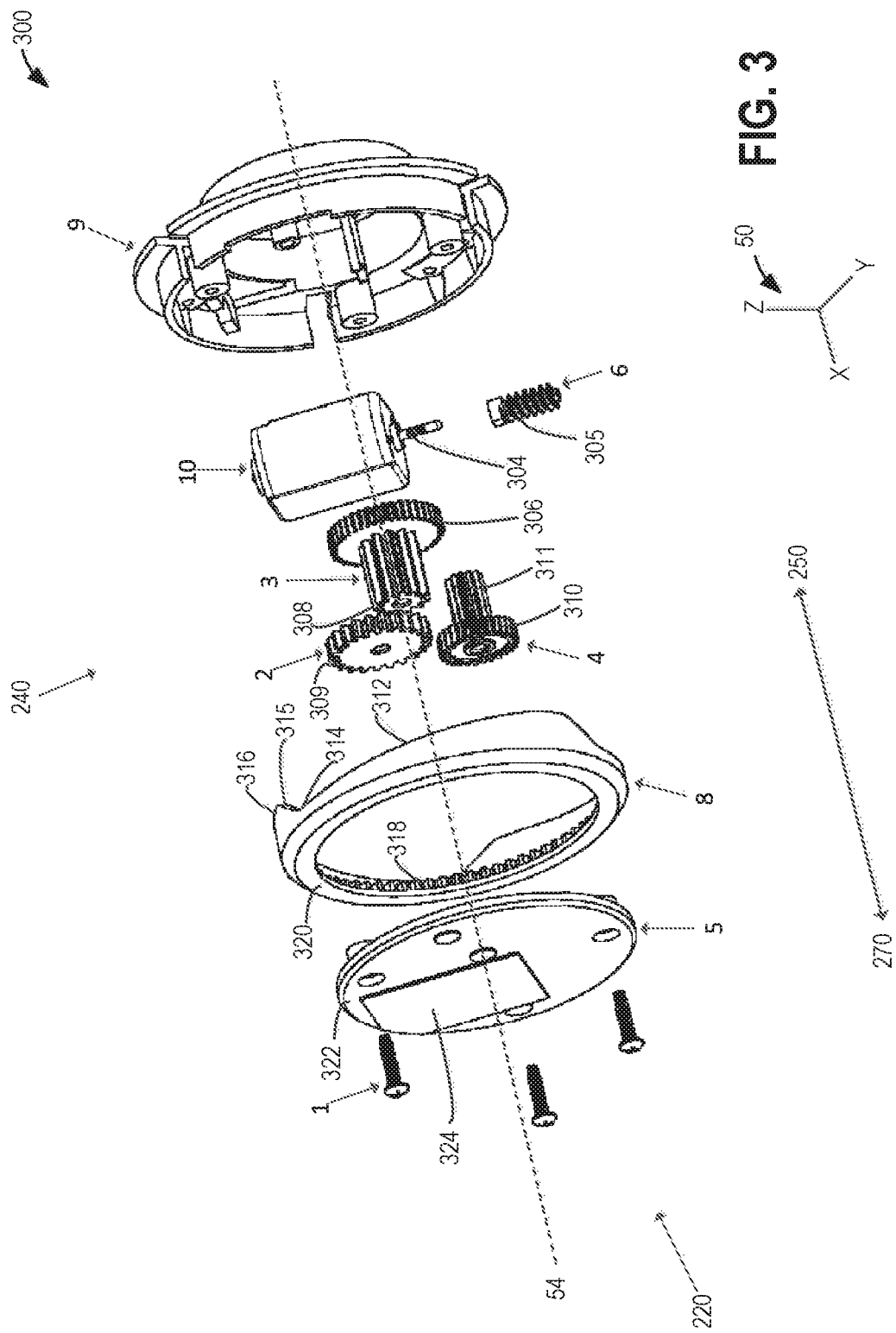
FIG. 3 shows a detailed view of the electric shift assembly of FIG. 2.

EHL 200 also includes an electric shift assembly 220. Electric shift assembly 220 includes an electric carrier 9 that serves as a housing for a plurality of internal components of the electric shift assembly 220. Internal components of the electric shift assembly 220 may include an electric motor 10. The electric motor 10 may be coupled to a worm gear 6, which may also be known as brake 6. The worm gear 6 is coupled to the gear reduction transmission 240, which may include worm gear 6, stage three gear 2, stage two gear 3, and helical drive gear 4. The stage three gear 2 may be coupled to an internal gear of cam gear 8. In this way, rotation of the motor 10 may elicit a rotational motion of cam gear 8 about central rotational axis 54 via the gear reduction transmission 240. It will be appreciated that any suitable configuration of the gear reduction transmission 240 may be used. The cam gear 8, motor 10, and gear reduction transmission 240 are coupled between the electric carrier 9 and an electric retainer 5. Electric retainer 5 may be coupled to electric carrier 9 using a plurality of fasteners 1. In the depicted example, the fasteners 1 are screws, but it will be appreciated that any suitable quantity and type of fastener may be used. The outer surface of electric retainer 5 may also include a cover 324, as shown in FIG. 3 (described further below). Cover 324 may serve as an access panel for performing service, repair and/or maintenance of the electric shift assembly 220.

Turning now to FIG. 3, it shows a detailed view 300 of the electric shift assembly 220 of FIG. 2. For reference, coordinate system 50 is shown, as well as central rotational axis 54 and directions 250 and 270. As previously described, the internal components of the electric shift assembly 220 are coupled between electric carrier 9 and electric retainer 5. Electric motor 10 is housed within the electric carrier 9, and may include a driveshaft 304. A worm gear 6 may be coupled to driveshaft 304, and worm gear 6 may include an external gear 305 that is configured as a threaded screw type gear allowed for continual rotation and actuation of a gear coupled thereto. The external gear 305 of worm gear 6 may mesh with and be coupled to a first external gear 310 of helical drive gear 4. In this way, rotation of electric motor 10 may be converted to rotation of helical drive gear 4. A second external gear 311 of helical drive gear 4 may couple and mesh with a first external gear 306 of stage two gear 3. Stage two gear 3 may include a second external gear 308 that may mesh and couple with external gear 309 of stage three gear 2. External gear 309 may be configured to couple and mesh with the internal gear 318 of cam gear 8. It will be appreciated that the gears described herein extending 360 degrees around the central rotational axis 54 of gears 6, 2, 3, and 4, although alternate configurations have been contemplated. In this way, rotation of electric motor 10 may result in a rotation of cam gear 8 about central rotational axis 54. It will be appreciated that in the depicted example, electric motor is configured to operate in one direction, resulting in cam gear 8 rotating in one direction. However, in other embodiments, electric motor 10 and/or gear reduction transmission 240 may be configured so that cam gear 8 may rotate in both a first and a second direction about central rotational axis 54, the first direction being opposite the first.

Cam gear 8 includes an integrated cam that includes a ramped surface 312, or ramped profile that ramps inward and outward in a direction of central rotational axis 54. Ramped surface 312 interacts with the tabs of cam follower 23, which will be described in more detail below in reference to FIG. 4. Starting with a low profile contact point 314, the ramped surface 312 profile extends further outward from the outer surface 320 of the cam gear 8 along a length of the ramped profile. As such, as the cam gear 8 is rotated, the ramped surfaces 312 may be rotated from a lower profile contact point contacting the tabs of cam follower 23 to a higher profile contact point 316 contacting the tabs of cam follower 23, thereby pushing the cam follower 23 inward toward the axle (e.g., axle 30 of FIG. 1). In other words, as the cam gear 8 rotates from a position where the lower profile contact point 314 contacts a tab of cam follower 23 to a position where the tab contacts a high profile contact point 316, this may cause the cam follower 23 to move in a direction 250, as shown in FIG. 2. The ramped surface 312 includes a gradual transition between low profile contact point 314 and high profile contact point 316 such that the tabs of cam follower 23 may continue without stopping from a position at high profile contact point 316 to a position at low profile contact point via transition 315. In this way, the cam may rotate in one direction and achieve repeatedly achieve the commanded position without reversing the direction of rotation. Further, the cam gear 8 may include multiple sets of the ramped surface 312, high profile contact point 316, and low profile contact point 313 (e.g., 3 shown in FIGS. 2 and 3) which may correspond to multiple tabs of the cam follower 23 (e.g., 3 shown in FIG. 2).

Figure 4:
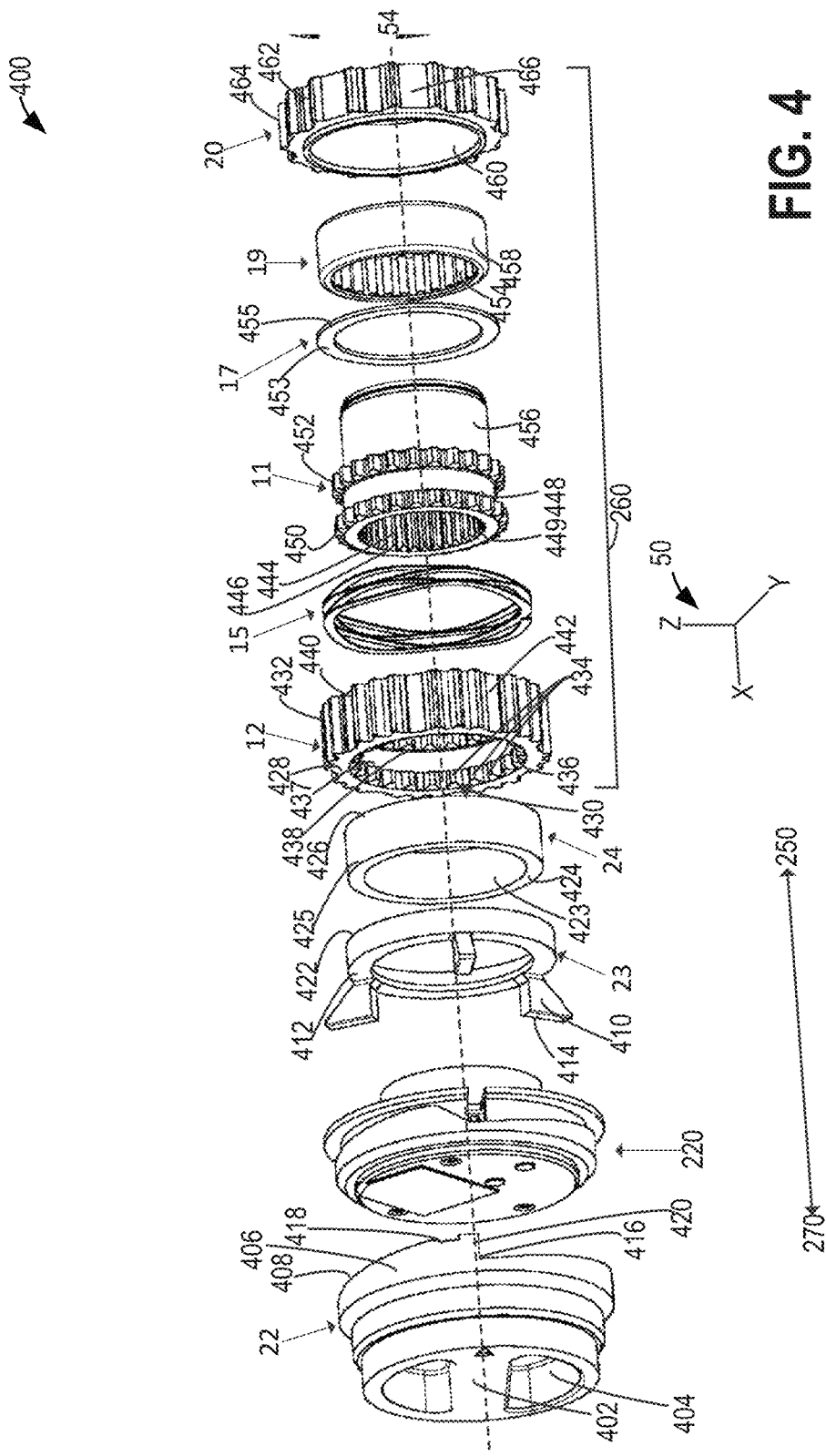
FIG. 4 shows a detailed view of the internal component set of FIG. 2.

Turning now to FIG. 4, it shows a detailed view 400 of the subassembly 280 that includes clutch ring assembly 260 of FIG. 2. For reference, coordinate system 50 is shown, as well as central rotational axis 54 and directions 250 and 270. Subassembly 280 includes manual dial 22, electric shift assembly 220, cam follower 23, block shift spring 24, and clutch ring assembly 260. As previously described, the clutch ring assembly 260 may include clutch ring 12, disengagement spring 15, inner drive gear 11, thrust washer 17, bearing 19, and bearing housing 20.

Starting with the outermost component of subassembly 280, manual dial 22 includes an outer surface 402 which may include one or more voids 404 to form a surface that may be readily manipulated by a user's hand. It will be appreciated that any suitable outer surface 402 configuration that provides for user manipulation may be used. In this way, a user may manually actuate the manual dial 22. Specifically, the user may rotate the manual dial 22 about central rotational axis 54.

Manual dial 22 includes an integrated cam 406 arranged around the perimeter of its inner surface. Integrated cam 406 may include a ramped surface 408 that extends around the perimeter of the inner surface of the manual dial 22. The ramped surface 408 of the integrated cam 406 of the manual dial 22 may interact (e.g., be in face-sharing contact) with one or more tabs 410 extending from outer surface 412 of the cam follower 23. Tabs (e.g., cams) 410 extend in the direction 270, away from the outer surface 412 of the cam follower 23. Specifically, ramped surface 408 may be biased to remain in face-sharing contact with a leading edge 414 of tab 410 by the force exerted on cam follower 23 (e.g., in direction 270) by disengagement spring 15. In the depicted example, cam follower 23 includes three tabs 410, but it will be appreciated that more or fewer tabs may be used. Integrated cam 406 includes a low profile contact point 416 and a high profile contact point 418. High profile contact point 418 may include a notched configuration to receive tab 410. In this way, the notch at high profile contact point 418 may hold tab 410 in place so that it doesn't move unintentionally. Specifically, the leading edge 414 may fit within the notch of high profile contact point 418.

Starting from the low profile contact point 416, traveling in a radial direction away from stop 420, the profile of ramped surface 408 extends further away from the outer surface 402 of the manual dial 22 (in the direction 250, parallel with the x-axis) as it travels along the length of the ramped profile, around the perimeter of the inner surface of the manual dial 22. It will be appreciated that the inner surface of the manual dial is opposite the outer surface 402 of the manual dial 22. Rotational input from the manual dial 22 causes the ramped surface 408 to rotate, causing the point of contact between leading edge 414 of tab 410 to travel along the profile of ramped surface 408, as cam follower 23 does not rotate about central rotational axis 54. As such, as the manual dial 22 is rotated in a direction to engage the EHL 200, the ramped surface 408 is rotated from the low profile contact point 416 contacting the leading edge 414 of tab 410 to a high profile contact point 418 contacting the leading edge 414 of tab 410, thereby pushing the cam follower 23 in direction 250. It will be appreciated that the configuration of the integrated cam 406, including stop 420 and the notched configuration of high profile contact point 418 dictates that the manual dial 22 may be rotated in a first direction to engage the four-wheel drive system, and a second direction to disengage the four-wheel drive system. Specifically, when the manual dial 22 is in the fully disengaged position, the leading edge 414 of tab 410 may be positioned in face-sharing contact with both the low profile contact point 416 and the stop 420. When the manual dial 22 is rotated toward the high profile contact point 418, in a rotational direction away from stop 420, the cam follower 23 is forced further from manual dial 22 (e.g., in direction 250) until the leading edge 414 of tab 410 enters the notch of high profile contact point 418. As previously described, the notch of high profile contact point 418 is shaped to receive and serves to "lock" the tab 410 of cam follower 23 in position and prevent unintended rotation of manual dial 22. Motion of the cam follower 23 in direction 250 causes the inner surface 422 of cam follower 23 to exert a force on outer surface 424 of the block shift spring 24, also in direction 250. In this way, a rotational input from manual dial 22 may be translated to an axial force in direction 250 on block shift spring 24 via cam follower 23. Block shift spring 24 includes an internal curved surface 423 and an external curved surface 425. Additionally, the manual dial 22 includes a sensor to determine the state (e.g., position) of the manual dial (e.g., engaged 4×4 or disengaged 4×2). For example, similar to sensor 710 described below with reference to FIG. 7, the manual dial may have a dedicated sensor to determine if the manual dial 22 is in the 4×4 state.

When the EHL 200 is assembled, disengagement spring 15 may be positioned between the thrust washer 17 and bearing 19. Rotation of the manual dial 22 in a direction that causes the cam follower 23 to travel in direction 250 may be sufficient to overcome the force of disengagement spring 15 acting in direction 270, thereby causing block shift spring 24 to displace clutch ring 12 in direction 250. Specifically, displacement of the block shift spring 24 in direction 250 causes the inner surface 426 of block shift spring 24 to exert a force on outer surface 428 of clutch ring 12, also in direction 250. As a result, clutch ring 12 may translate in direction 250.

Clutch ring 12 includes a clutch ring interior splined surface 430 and a clutch ring exterior splined surface 432. The interior splined surface 430 includes a plurality of splines 434 extending 360 degrees around the central rotational axis 54. Specifically, in the depicted example, the interior splined surface 430 includes a first sent of splines 436 and a second set of splines 438 spaced apart from one another (e.g., with a gap therebetween) and at opposite ends of the clutch ring 12. It will be appreciated that in the depicted example, gap 437 does not include splines. The second set of splines 438 is positioned inward with respect to the first set of splines 436. The splines in the clutch ring interior splined surface 430 are configured to mate with splines of the inner drive gear 11, in an engaged configuration of the subassembly 280.

The clutch ring 12 exterior splined surface 432, includes a plurality of splines 440 and is configured to mate with a wheel attachment interface (e.g., hub) 36 in a vehicle wheel assembly, shown in FIG. 1. Although not show, wheel attachment interface 36 may include splines configured to mate with the exterior splined surface 432 of clutch ring 12. In this way, the clutch ring 12 may be axially displaced along the x-axis to selectively engage and disengage with the inner drive gear 11 while remaining coupled to the wheel attachment interface 36. Additionally, the exterior splined surface 432 includes gaps 442. The gaps 442 may be oriented parallel with central rotational axis 54 and configured to receive cage pins 214 (shown in FIG. 2). Thus, cage pins 214 may extend through the gaps 442 when the clutch ring assembly 260 is assembled in the cage 14. Further, the clutch ring 12 may include a same number of gaps 442 as the number of cage pins 214, each pin 216 positioned within a corresponding gap 442 In one example, a thickness of the cage pins 214 may determine a width of each gap 442. As such, thinner cage pins 214 may allow for smaller gaps 442, thereby allowing for more splines 440 and a stronger clutch ring 12.

The inner drive gear 11 includes an interior splined surface 444 configured to attach to (e.g., mate with) a splined surface in a vehicle axle, such as one of the vehicle axles 30, shown in FIG. 1. The interior splined surface 444 includes a plurality of splines 446 extending 360 degrees around the central rotational axis 54. The inner drive gear 11 further includes a drive gear exterior splined surface 448 including a plurality of splines 446. Specifically, the exterior splined surface 448 includes a first set of splines 450 and a second set of splines 452 spaced apart from one another (along the central rotational axis 54) and configured to mate with the first and second sets of splines (436 and 438, respectively) included in the clutch ring 12 when the locking hub system is in an engaged configuration. Likewise, the splined surfaces in the clutch ring 12 and the inner drive gear 11 may be axially offset (in the x-direction) when the locking hub system is in a disengaged configuration. For example, in the disengaged confirmation none of the splined surfaces of the clutch ring 12 and the inner drive gear 11 may mate with one another. In this way, the inner drive gear 11 and clutch ring 12 can be decoupled from one another enabling the inner drive gear 11 to freely rotate with respect to the clutch ring 12.

It will be appreciated that in the engaged configuration, an outer surface 449 of the inner drive gear 11 may be in approximately the same plane as outer surface 428 of clutch ring 12. Further, in a disengaged position, outer surface 449 may be offset in direction 250 from surface 428.

As previously described, the clutch ring assembly 260 may further include a thrust washer 17 positioned between the inner drive gear 11 and bearing 19 (e.g., roller bearing). Specifically, an outer surface 453 of thrust washer 17 may contact the inner surface of spline set 452, and an inner surface 455 of thrust washer 17 may contact bearing 19. The bearing 19 includes cylindrical rollers 454, in the depicted example. An external cylindrical surface 456 of the inner drive gear 11 is configured to contact the cylindrical rollers 454 when the clutch ring assembly 260 is assembled. Thus, the bearing 19 enables rotation of the inner drive gear 11 about the central rotational axis 54. In other words, the bearing 19 is rotationally coupled to the inner drive gear 11. The bearing 19 further includes an outer race 458 which is positioned in and fixedly coupled to the bearing housing 20 when the clutch ring assembly 260 is assembled. In particular, the outer race 458 may be in face sharing contact with an interior surface 460 of the bearing housing 20. As previously described, a retaining (e.g., snap) ring 18 (shown in FIG. 2), may also be provided to retain the bearing 19 in the bearing housing 20.

The bearing housing 20 further includes a bearing housing exterior splined surface 462 including a plurality of splines 464. It will be appreciated that each of the splines has a similar size and geometry in the depicted examples. As shown, the exterior splined surface 462 extends 360 degrees around the central rotational axis 54 where consecutive splines are separated by gaps 466 between the splines 464. However, in other examples the exterior splined surface 462 may not include gaps 466 between the splines 464. Additionally, the exterior splined surface 462 spans the axial with of the bearing housing 20. However in other example, the exterior splined surface 462 may only axially extend across a portion of the bearing housing 20.

Figure 5:
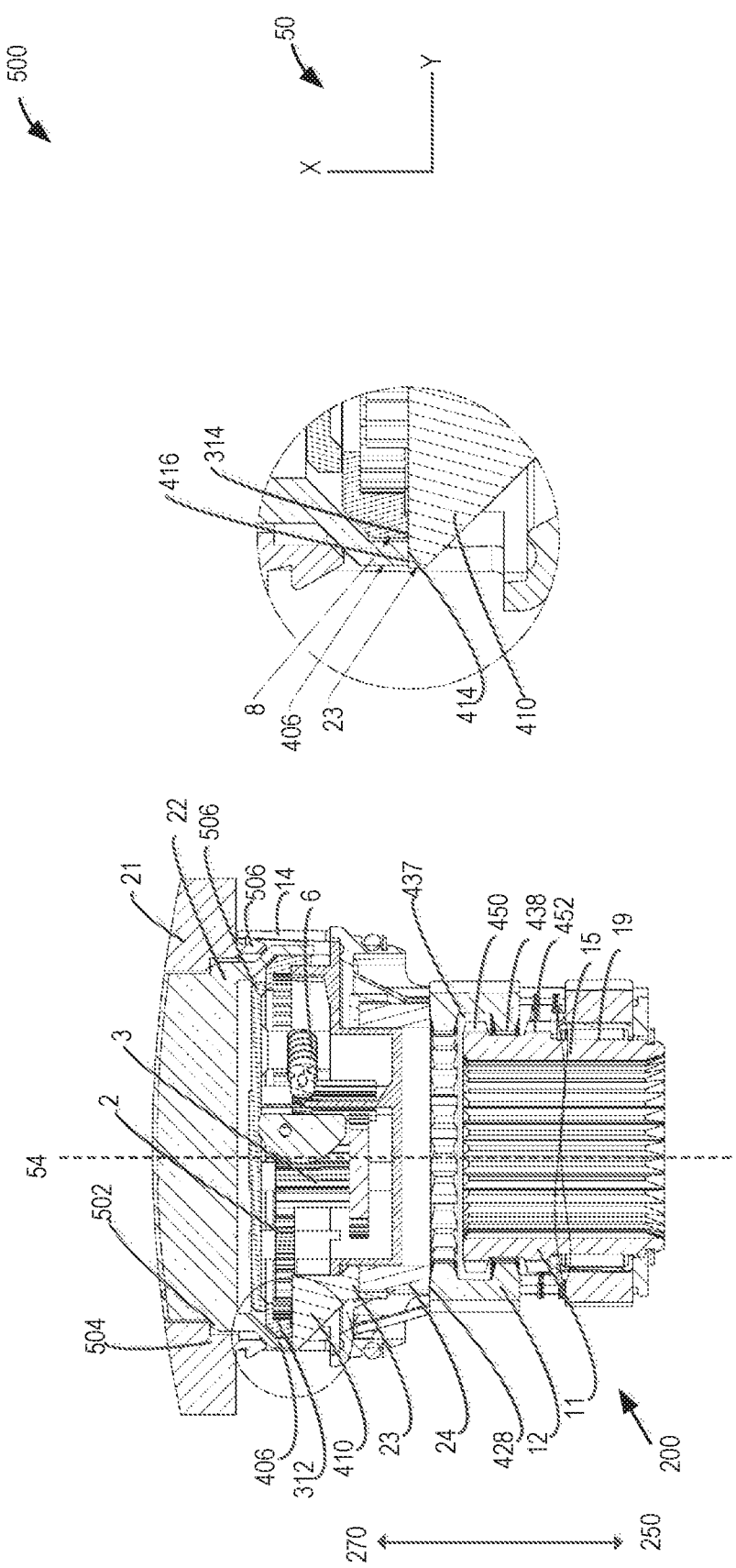
FIG. 5 shows an example cross section of an electric hub lock in two-wheel drive mode, according to one embodiment of the current disclosure.

Turning now to FIG. 5, it shows an example cross section 500 of an electric hub lock in two-wheel drive mode, according to one embodiment of the current disclosure. It will be appreciated that the electric hub lock shown in FIG. 5, may be identical or similar to the EHL 200 shown in FIG. 2. Identical components will be similarly numbered. For reference, coordinate system 50 is shown, as well as central rotational axis 54 and directions 250 and 270.

The EHL 200 may be configured to an engaged or a disengaged position. As previously described, the engaged position correlates with a four-wheel drive mode and the disengaged position correlates with a two-wheel drive mode. For the vehicle to operate in a disengaged, two-wheel drive mode, both the manual dial 22 and the cam gear 8 of the electric shift assembly 220 (shown in FIGS. 2-3) are set to two-wheel drive mode. Specifically, both the manual dial 22 and the integrated cam 312 are positioned such that the leading edge 414 of tab 410 is in contact with the low profile contact point 416 of the manual dial 22 and the low profile contact point 314 of the cam gear 8.

Further, as a result of the leading edge 414 of tab 410 of the cam follower 23 being located at the low contact point 416 of the manual dial 22 at the same time the leading edge 414 of tab 410 of the cam follower 23 is located at the low contact point 314 of the cam gear 8, the clutch ring 12 is not engaged with the internal drive gear 11. As shown in FIG. 5, the first set of splines 450 of the inner drive gear 11 aligns with gap 437 of the clutch ring 12. As a result, splines of the inner drive gear 11 and the clutch ring 12 do not mesh, and the rotation of the splined axle shaft coupled to the interior splined surface 444 of the internal drive gear 11 may not be conveyed to the wheels 38. Further, exterior spline set 452 of inner drive gear 11 does not align with internal spline set 438 of clutch ring 12.

As shown in Detail H of FIG. 5, the integrated cam 406 of the manual dial 22 is positioned outside of, relative to axis 54, cam gear 8. In other words, the diameter of integrated cam 406 has a larger diameter than the ramped surface 312 of the cam of cam gear 8.

Select components of FIG. 5 are labeled for reference, including cap 21 and manual dial 22. As previously mentioned, annular grooves, or steps 504, on an internal surface of cap 21 may align and couple with complementary annual grooves, or steps 502, on an exterior manual dial 22. Additionally, cap 21 may include one or more features 506 that may couple to cage 14. In this way, cap 21 may capture manual dial 22 and internal components between cap 21 and cage 14, and may also serve to protect manual dial 22 from debris and/or damage. Disengagement spring 15 and bearing 19 are shown for reference.

Cam gear 8 can also be seen "captured" by manual dial 22. The position of disengagement spring is also shown between an outer surface of bearing 19 and an inner surface of the second set of splines 452 of inner drive gear 11, shown in FIG. 4. An outer face 428 of clutch ring 12 is shown in face sharing contact with block shift spring 24, and block shift spring 24 is shown in face sharing contact with cam follower 23. Worm gear 6, stage two gear 3 and stage three gear 2 are also shown for reference.

Figure 6:
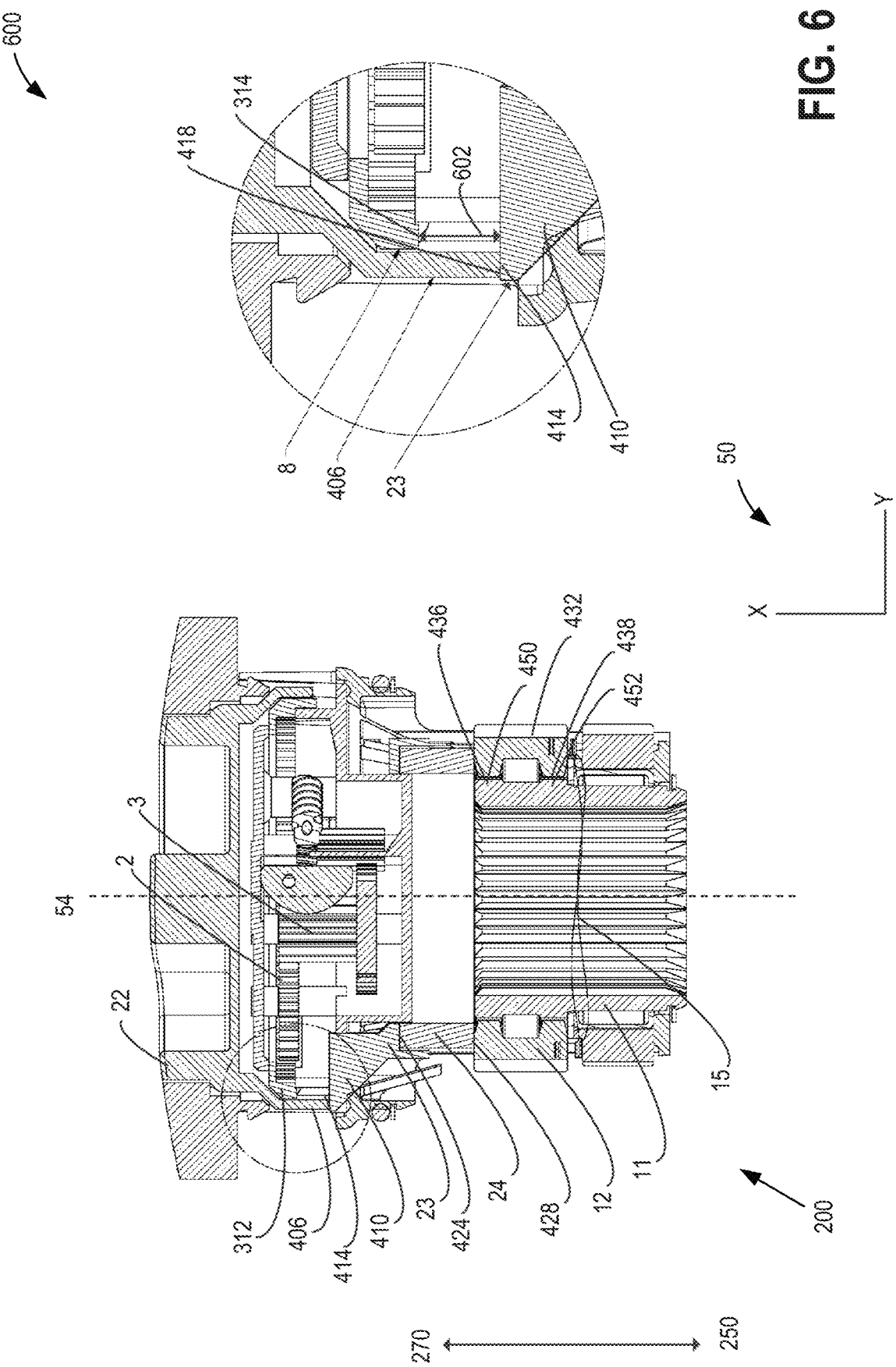
FIG. 6 shows an example cross section of an electric hub lock in an engaged configuration while in manual mode.

Turning now to FIG. 6, it shows an example cross sectional view 600 of an electric hub lock in an engaged configuration while in manual mode. It will be appreciated that the electric hub lock shown in FIG. 5, may be identical or similar to the EHL 200 shown in FIG. 2. Identical components will be similarly numbered. For reference, coordinate system 50 is shown, as well as central rotational axis 54 and directions 250 and 270.

One example operating mode of EHL 200 includes a manual mode, where an operator of the vehicle may manually actuate the manual dial 22 positioned proximate and coupled to a vehicle wheel 38, as shown in FIG. 1. Specifically, the user may rotate the manual dial 22 in order to actuate a change in the engagement configuration of the EHL 200 (without electrical input from a controller of the vehicle or EHL system). Specifically, in manual mode, an operator may rotate the dial 22 about a central rotational axis 54 to select an automatic mode or a 4×4 mode. It will be appreciated that other mode selections have been contemplated. In the example configuration depicted in FIG. 6, the manual dial 22 is actuated to a position that engages the four-wheel drive system, as may have been a result of a user's desire to operate the vehicle four-wheel drive mode.

In this way, physical rotation of the manual dial 22 into a position indicates a request to engage the EHL 200 and move the drivetrain into a 4×4 mode. Rotation of the manual dial 22 toward a 4×4 mode position, induces rotation of the integrated cam 406 (shown in FIG. 4) in the same direction. Because the leading edge 414 of tab 410 is in face sharing contact with the integrated cam 406, rotation of the integrated cam 406 in toward the high profile contact point 418 causes the cam follower 23 to be translated in direction 250 as it travels along the integrated cam 406 toward the high profile contact point 418. Translation of the cam follower 23 in the direction 250 forces the cam follower 23 to come into face-sharing contact with and exert a translation force against the outer surface 424 of block shift spring 24, also in the direction 250. Compression of the block shift spring 24 exerts a translational force against the outer surface 428 of clutch ring 12. This force on the outer surface 428 of clutch ring 12 in the direction 250 overcomes the counterforce (e.g., in a direction 270) of disengagement spring 15, causing the clutch ring 12 to translate in direction 250. In the engaged configuration, splines on the internal surface of clutch ring 12 well as the splines on the outer surface of the inner drive gear 11 are mated to enable rotational input to be transferred from the inner drive gear 11 to the clutch ring 12. Specifically, spline set 436 mates with spline set 450, and spline set 438 mates with spline set 452. In some examples, engagement of the four-wheel drive system may include the cam follower 23 being moved to an inner-most position. In this way, the inner drive gear 11 and the clutch ring 12 can jointly rotate. It will be appreciated that an axle provides the rotational input to the inner drive gear 11, such as the one of the axles 30, as shown in FIG. 1. As such, the rotational input from the axle coupled to the inner drive gear 11 may be transferred to the wheel (e.g., wheel 38 of FIG. 1) via the exterior splined surface 432 on the clutch ring 12. Further detail regarding transference of rotational input from the axle to the wheel will be discussed below in reference to FIGS. 9-10. It will be appreciated that when engaging the four-wheel drive system into an engaged configuration manually, the cam gear 8 of electric shift assembly 220 may not rotate. In this way, the integrated cam 406 of the manual dial forces the leading edge 414 of the tab 410 of the cam follower 23 away from the low profile contact point 314 of the surface 312 of the cam gear 8. In this way, a gap 602 may form between the leading edge 414 of tab 410 and the low profile contact point 314. In this way, a manual request for four-wheel drive mode may override a two-wheel drive automatic mode. In other words, a manual request for engaging the EHL 200 will engage the EHL even if the automatic, electric configuration is actuated to a disengaged, two-wheel drive mode.

Figure 7:
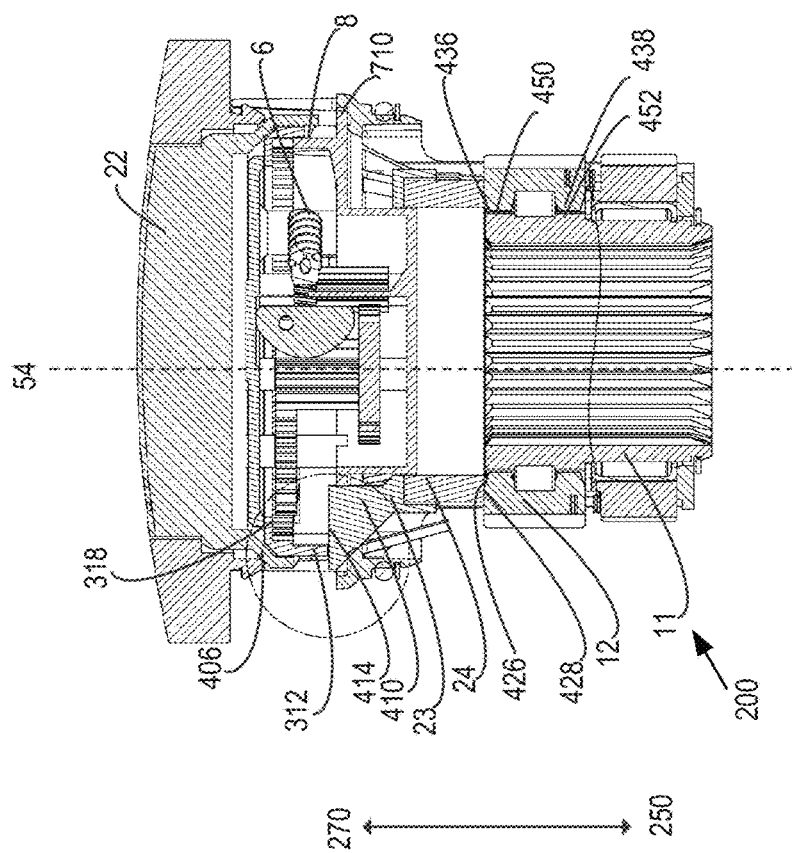
FIG. 7 shows an example cross section of an electric hub lock in an engaged configuration while in electric (e.g., automatic) mode.

Turning now to FIG. 7, it shows an example cross sectional view 700 of an electric hub lock in an engaged configuration while in electric (e.g., automatic) mode. It will be appreciated that the electric hub lock shown in FIG. 5, may be identical or similar to the EHL 200 shown in FIG. 2. Identical components will be similarly numbered. For reference, coordinate system 50 is shown, as well as central rotational axis 54 and directions 250 and 270.

One example of an EHL 200 control method includes a vehicle-controlled automatic mode wherein the controller may send a signal to an actuator of the EHL 200 to engage or disengage the EHL. In one example, a control device, such as a button, knob, lever, or electronic selection on a display device in a passenger compartment (not shown) may be actuated by a user in order to select a mode of operation. In one example, a user may electronically select an engaged, 4×4 mode, or a disengaged 4×2 mode. Optionally, the user may also select between a 4HI and a 4LO mode. In this way, the EHL 200 may be automatically moved between the engaged and disengaged configurations without the user exiting the vehicle and manually actuating a dial coupled to each of wheels 38, as shown in FIG. 1. In the example configuration depicted in FIG. 7, the electric shift assembly 220 (shown in FIGS. 2-4) is actuated to a position that engages the four-wheel drive system, as may have been a result of an request from a user desire to operate the vehicle four-wheel drive mode that does not include physically actuating the manual dial 22 exterior to the vehicle, proximate a vehicle wheel 38 (as shown in FIG. 1).

Responsive to a request to engage the EHL 200 and operate the vehicle in four-wheel drive mode, a vehicle controller (e.g., vehicle controller 42 of FIG. 1) may receive a signal from the control device to operate the drivetrain in four-wheel drive mode. Responsive to the request, the controller may send a signal to an actuator of the slip ring assembly, described further below in reference to FIG. 9, in order to generate and deliver power to the motor 10 via a printed circuit board (PCB or PCBA) motor drive connection (e.g., electric hub lock connection), as will be described further in reference to FIG. 9. The power from the motor drive connection communicates with the motor 10 (of FIG. 2), causing the motor 10 to rotate. Rotation of the motor 10 rotates a driveshaft, causing the brake (e.g., worm gear 6) coupled to the motor 10 to rotate in a corresponding direction. As previously described, the worm gear 6 is coupled to the internal gear 318 of the cam gear 8 via gear reduction transmission that includes stage two gear 3 and stage three gear 2, as described in reference to FIG. 3. Actuation of the gear reduction transmission causes rotational motion of the electric cam gear 8 about central rotational axis 54. Rotational motion of the electrical cam gear 8 insights translational motion of cam follower 23, as the leading edge 414 of tabs 410 of cam follower 23 (shown in FIG. 2) travel along the ramped profile 312 of the cam gear 8. Responsive to an electronic request to operate the EHL 200 in four-wheel mode, vehicle controller 42 may send a signal to an electric motor 10 coupled to the EHL system to drive the gear reduction transmission 240 (as shown in FIGS. 2-3) in order to actuate cam gear 8. In one example, electric motor 10 may be a printed circuit board (PCB) motor. Gear reduction transmission 240 may include worm gear 6, stage three gear 2, stage two gear 3, and helical drive gear 4. In the depicted embodiment, the worm gear 6 may act as the brake in addition to adding gear reduction. The final stage of reduction is a cam gear 8 that includes an internal tooth gear 318. The cam gear 8 rotates to the next state and drives the cam follower 23 into the block shift spring 24.

The EHL may include a mode sensor 710 to determine the position of the cam follower 23 and/or the manual dial 22 and/or the electric shift assembly 220 (as shown in FIGS. 2-3) and confirm the EHL is in thein the commanded position. In one example, the mode sensor may be a Hall Effect sensor that may be positioned to measure the position of the electric shift assembly or the cam follower. Therein, a magnetic field generated by one or more magnets would be detected by the mode sensor 710 and used to determine the state of the electric shift assembly or the cam follower 23. In another example, the mode sensor 710 may comprise an optical sensor that may be positioned to measure the position of the electric shift assembly or the cam follower. In a further example, the mode sensor 710 may comprise a mechanical switch may be actuated at each state (4×4 mode and 2×2 mode). Therein, one or more features coupled to one or more of the electric shift assembly, cam follower, and the manual dial may press or release an actuator when the electric shift assembly or cam follower is in each state. In another example, the mode sensor 710 may comprise an encoder that may locate the rotational or linear position of the electric shift assembly or the cam follower 23. And in yet another example, the mode sensor 710 may comprise a rotational or linear potentiometer that may determine the position of the electric shift assembly or cam follower 23.

Responsive to the controller receiving a signal from the mode sensor indicating that the cam follower 23 is in the commanded position, the vehicle controller 42 to stop the shift sequence. Stopping the shift sequence may include stopping or withholding electrical power to an actuator of the electric motor 10. Actuation of the cam gear 8 may cause axial displacement of the cam follower 23, as the ramped surface 312 may be in face-sharing contact with the leading edge 414 of tab 410 of cam follower 23. Axial displacement of cam follower 23 (e.g., in direction 250) may cause the cam follower 23 to compress and/or displace the block shift spring 24 in direction 250. As previously described, the inner surface 426 of the block shift spring 24 contacts and exerts a similar axial force against the outer surface 428 of the clutch ring 12. The clutch ring may then undergo an axial displacement in direction 250, engaging it with the internal drive gear 11. If the splines on the clutch ring and inner drive gear 11 are not aligned the block shift spring is compressed. This allows the motor and cam to drive through a complete shift cycle and stop at is next mode state without stalling the motor. When the splines become aligned the clutch ring is forced into its engaged state by the spring. The disengagement spring 15 is overcome by the motion block shift spring 24 and is compressed. Once the clutch ring is in its engaged state it is able to transfer torque from the axle through the internal drive gear and clutch ring to the hub and wheel. As previously described, in the engaged configuration, splines on the internal surface of clutch ring 12 well as the splines on the outer surface of the inner drive gear 11 are mated to enable rotational input to be transferred from the inner drive gear 11 to the clutch ring 12. Specifically, spline set 436 mates with spline set 450, and spline set 438 mates with spline set 452. In some examples, engagement of the four-wheel drive system may include the cam follower 23 being moved to an inner-most position with respect to wheel 38 (as shown in FIG. 1).

It will be appreciated that when engaging the four-wheel drive system into an engaged configuration automatically (e.g., electronically), the cam gear 8 of electric shift assembly 220 may rotate against the cam follower 23. In this way, the integrated cam surface 312 of the cam gear 8 may rotate until the high profile contact point 316 is in contact with leading edge 414 of tab 410. Rotation of the cam gear causes the cam follower 23 away from the low profile contact point 416 of the manual dial 22. In this way, a gap 702 may form between the leading edge 414 of tab 410 and the low profile contact point 416. In this way, an electronic, or automatic request for four-wheel drive mode may override a two-wheel drive manual mode setting. In other words, an electronic request for engaging the EHL 200 will engage the EHL even if the manual configuration is actuated to a disengaged (e.g., automatic) two-wheel drive mode.

Figure 8:
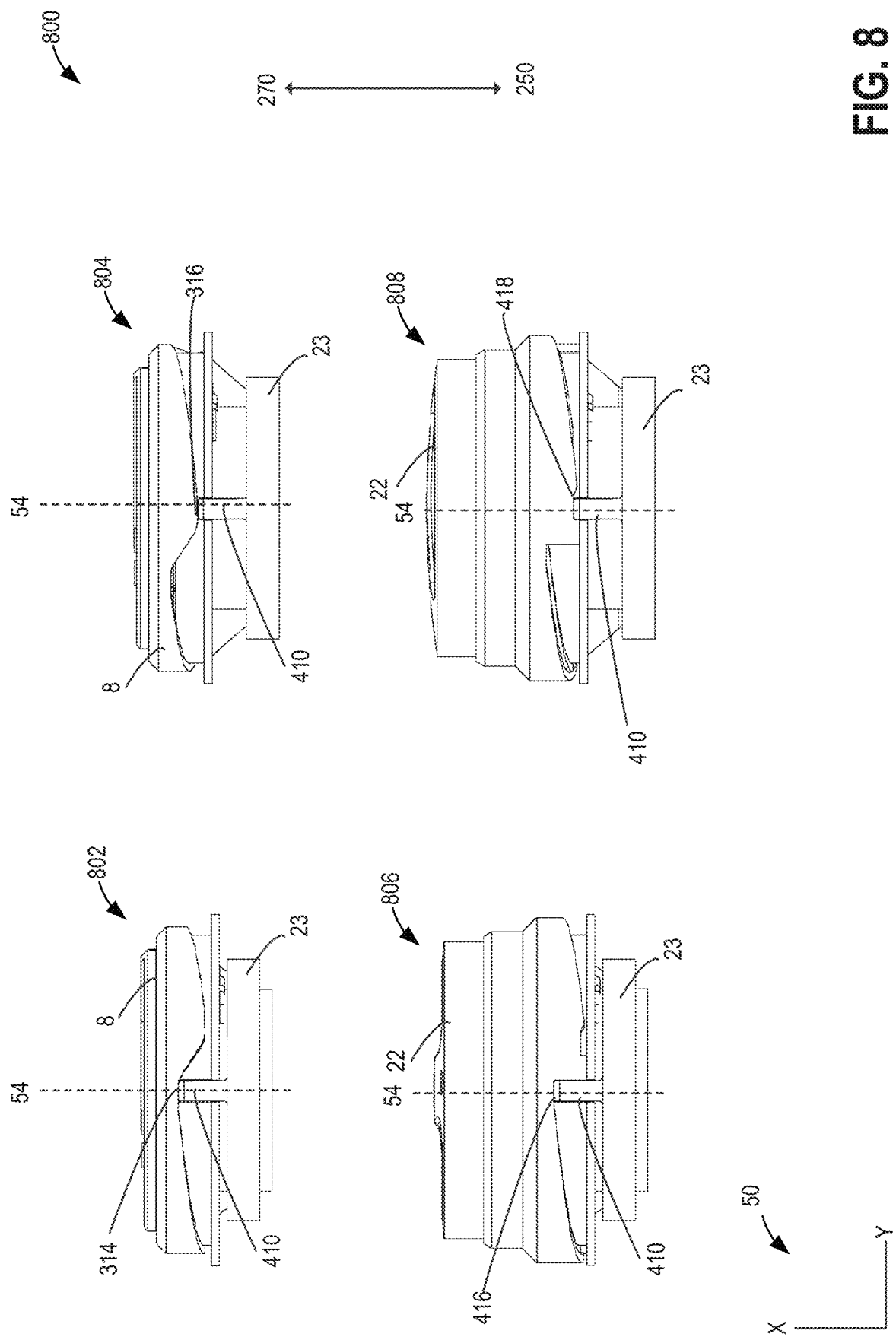
FIG. 8 shows example side views of the electric shift assembly, manual shift assembly, and cam follower in four different configurations.

Turning now to FIG. 8, it shows example side views 800 of the cam gear 8, manual dial 22, and cam follower 23 in four different configurations. It will be appreciated that the views of FIG. 8 may include identical or similar components of EHL of FIG. 2 that have been previously described with reference to FIGS. 1-7. As such, identical or similar components may be similarly numbered. For reference, coordinate system 50 is shown, as well as central rotational axis 54 and directions 250 and 270.

These components and the components coupled to them have been described earlier, and as such, will not be described in detail here. A table of possible configurations of the EHL (e.g., EHL 200 of FIG. 2) is shown below. It will be appreciated that an AUTO position corresponds with a two-wheel drive, or disengaged position as previously described.

| Manual Dial Position (view of FIG. 8) | AUTO (806) | AUTO (806) | 4 × 4 (808) | 4 × 4 (808) |
| Electric Shift Assembly Position (view of FIG. 8) | 4 × 2 (802) | 4 × 4 (804) | 4 × 2 (802) | 4 × 4 (804) |
| Actual EHL configuration | 4 × 2 | 4 × 4 | 4 × 4 | 4 × 4 |

Example side view 802 shows cam gear 8 in a 4×2 configuration. Therein, the low profile contact point 314 of the cam gear 8 is in contact with the tab 410 of cam follower 23. The disengagement spring (shown in FIGS. 2, 4, and 5) provides a force in the direction 270, keeping the EHL out of the engaged position. Specifically, the EHL 200 is in a disengaged position in view 802. It will be appreciated that the manual dial 22 may also be positioned in a 4×2 (e.g., AUTO) position in example view 802.

Example side view 804 shows cam gear 8 in a 4×4 configuration. Therein, the high profile contact point 316 of the cam gear 8 is in contact with tab 410. The disengagement spring that provides a force in the direction 270 was overcome by the translation of the cam follower 23 in the direction 250. Compression of the disengagement spring allows the EHL to enter an engaged position (four-wheel drive mode). It will be appreciated that the manual dial 22 may be positioned in a 4×2 (e.g., auto) position or a 4×4, engaged position in example view 804.

Example view 806 shows the EHL actuated manually to a 4×2 configuration. Therein, the high profile contact point 416 of the integrated cam of the manual dial 22 may contact tab 410 of cam follower 23. The disengagement spring (shown in FIGS. 2, 4, and 5) provides a force in the direction 270, keeping the EHL out of the engaged position. It will be appreciated that the electric shift assembly may also be positioned in a 4×2 position in example view 806.

Example view 808 shows the EHL manually actuated to a 4×4 configuration. Therein, the low profile contact point 418 of the integrated cam of the manual dial 22 may contact the tab 410 of cam follower 23. The disengagement spring that provides a force in the direction 270 was overcome by the translation of the cam follower 23 in the direction 250. Compression of the disengagement spring allows the EHL to enter an engaged position (four-wheel drive mode). It will be appreciated that the electric shift assembly may be positioned in a 4×2 (e.g., auto) position or a 4×4, engaged position in example view 808.

In this way, if either the manual dial or the electric shift assembly are positioned in an engaged, four-wheel drive mode configuration, the vehicle drivetrain will be operated in four-wheel drive. Both the manual dial and the electric shift assembly must be positioned in the disengaged four-wheel drive mode configuration for the vehicle drivetrain to be operated in four wheel drive. As a result, the electric hub lock includes an override function that allows a request to operate the drivetrain in four-wheel drive to supersede a request to operate the drivetrain in a 4×2 or automatic (e.g., AUTO) mode.

Figure 9:
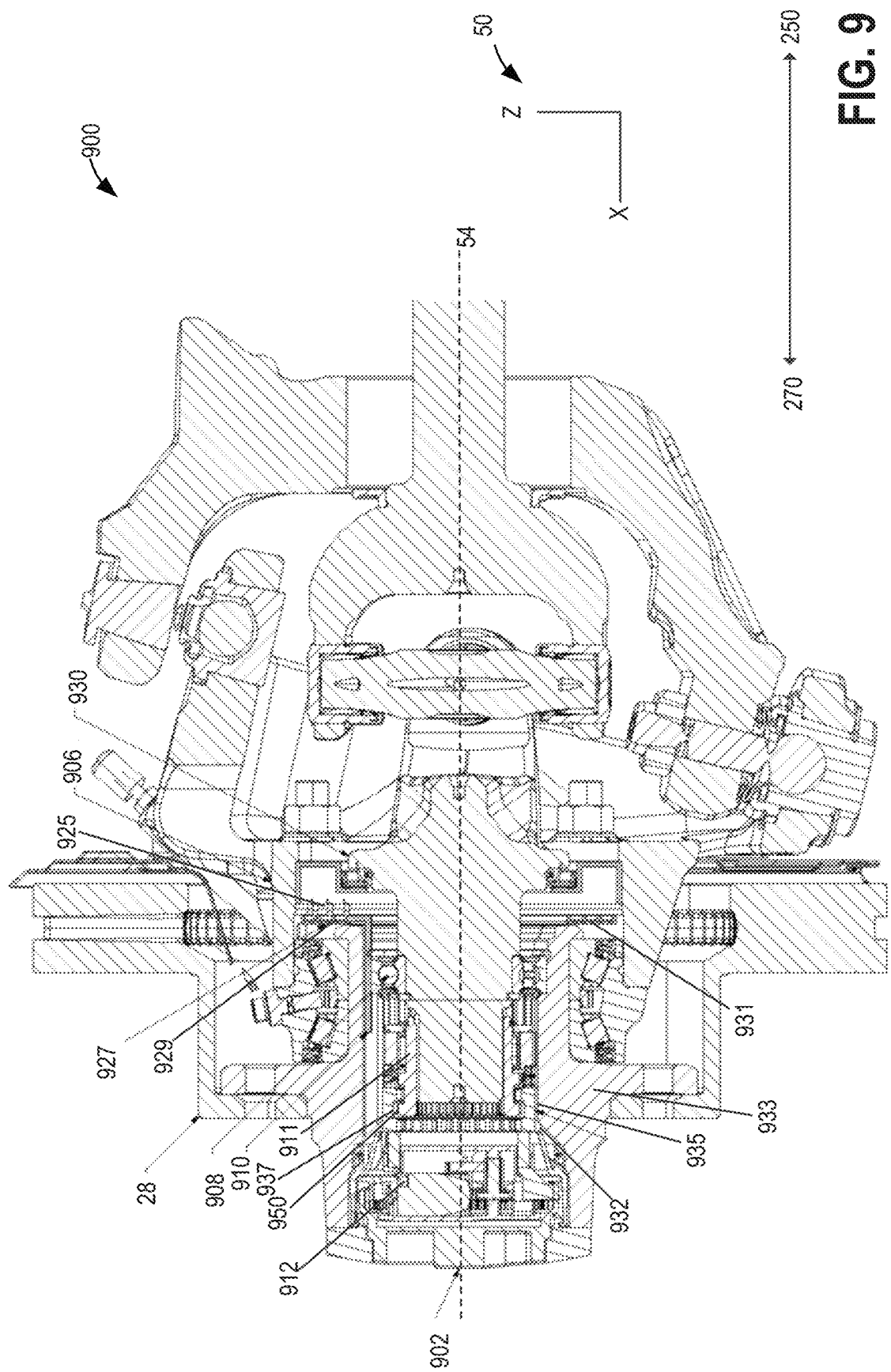
FIG. 9 shows an example cross section of an axle hub assembly that includes an electric hub lock in two-wheel drive mode.

Turning now to FIG. 9, an example cross sectional view 900 of an axle hub assembly that includes an electric hub lock 902 is shown. For reference, coordinate system 50 is shown, as well as central rotational axis 54 and directions 250 and 270. It will be appreciated that electric hub lock 902 may be identical or similar to EHL 200 of FIG. 2 and share identical or similar components. In the depicted example, the electric hub lock 902 is actuated into a two-wheel drive, disengaged configuration. An axle shaft 930 is shown coupled to the electric hub lock 902, which includes an electric hub lock connection 910. In one example, electric hub lock connection may include a printed circuit board motor or other suitable motor drive connection. The electric hub lock connection 10 serves as a path for electrical power to reach the motor 10 (shown in FIGS. 2-3) from an electrical power source of vehicle 100 (shown in FIG. 1). The EHL 902 rotates with the wheel when the vehicle is bring propelled. In order to transfer electrical power and the command signals to and from the EHL and associated sensors, a slip ring assembly 927 may be used. In one example, slip ring assembly 927 may be positioned proximate a knuckle 906, which is the interface between the stationary portion of the wheel assembly (e.g., attached to vehicle 100 of FIG. 1) and the rotating portion of the wheel assembly (e.g., attached to wheel 38 of FIG. 1). Further slip ring assembly 927 may include an external brush assembly electrically connected to one or more slip ring 929. The slip rings 929 may be wireless (e.g., inductive) or a brushed style. Other style slip rings have been contemplated. The stationary portion 925 of the slip ring assembly 927 is pressed into the knuckle 906 and has an integrated seal 918 (not shown) for the axle shaft 930. The rotational portion 931 of the slip ring assembly 927 is keyed to the hub 933.

In one example, the electrical power to operate the EHL is conveyed from the internal, stationary portion 925 of the slip ring assembly 927 to the outer, rotational portion 931 of the slip ring assembly 927. The electric hub lock connection 910 may be coupled to the outer, rotational portion 931 of the slip ring assembly 927 such that power and signals may be delivered to the motor 10 from the slip ring assembly via the electric hub lock connection 910. In one example, the electric hub lock connection 910 may be an insulated conductor. In other words, when the EHL is installed in the hub 933, electric hub lock connection 910 creates an electrical connection between the power source of the vehicle and the electric hub lock 902. The electric hub lock connection, or electric hub lock connector 910 couples the rotating portion 931 of the slip ring assembly 927 to the rotating EHL 902 so that electrical power and electric signals may be communicated between the slip ring and the motor 10 (shown in FIG. 2). One or more pockets provide a mounting location for the electric hub lock connection 910 around the outside diameter of the axle bearing 908. It will be appreciated that there may be other suitable methods for. In one example, transmitting electric power and control data signals to/from the electric hub lock 902 may be performed via an inductive coupling.

It will be appreciated that axle shaft 930 may be identical or similar to axle 30 of FIG. 1. In the disengaged, two-wheel configuration, the splines of the inner gear drive 911 do not align with the splines of the clutch ring 912. Specifically, the spline 950 of inner drive gear 911 may align with gap 937 of clutch ring 912. As a result, the rotational input from the axle shaft 930 coupled to the inner drive gear 911 may not be transferred to the wheel (e.g., wheel 38 of FIG. 1) via the hub 933 via the exterior splined surface 932 of the clutch ring 912 when in the disengaged configuration. It will be appreciated that the exterior splined surface 932 of the clutch ring 912 may mesh with a complementarily splined surface 935 of hub 933. In this way, the clutch ring 912 is coupled to the hub 933, even as it is axially translated to engage and disengage the EHL 902

Figure 10:
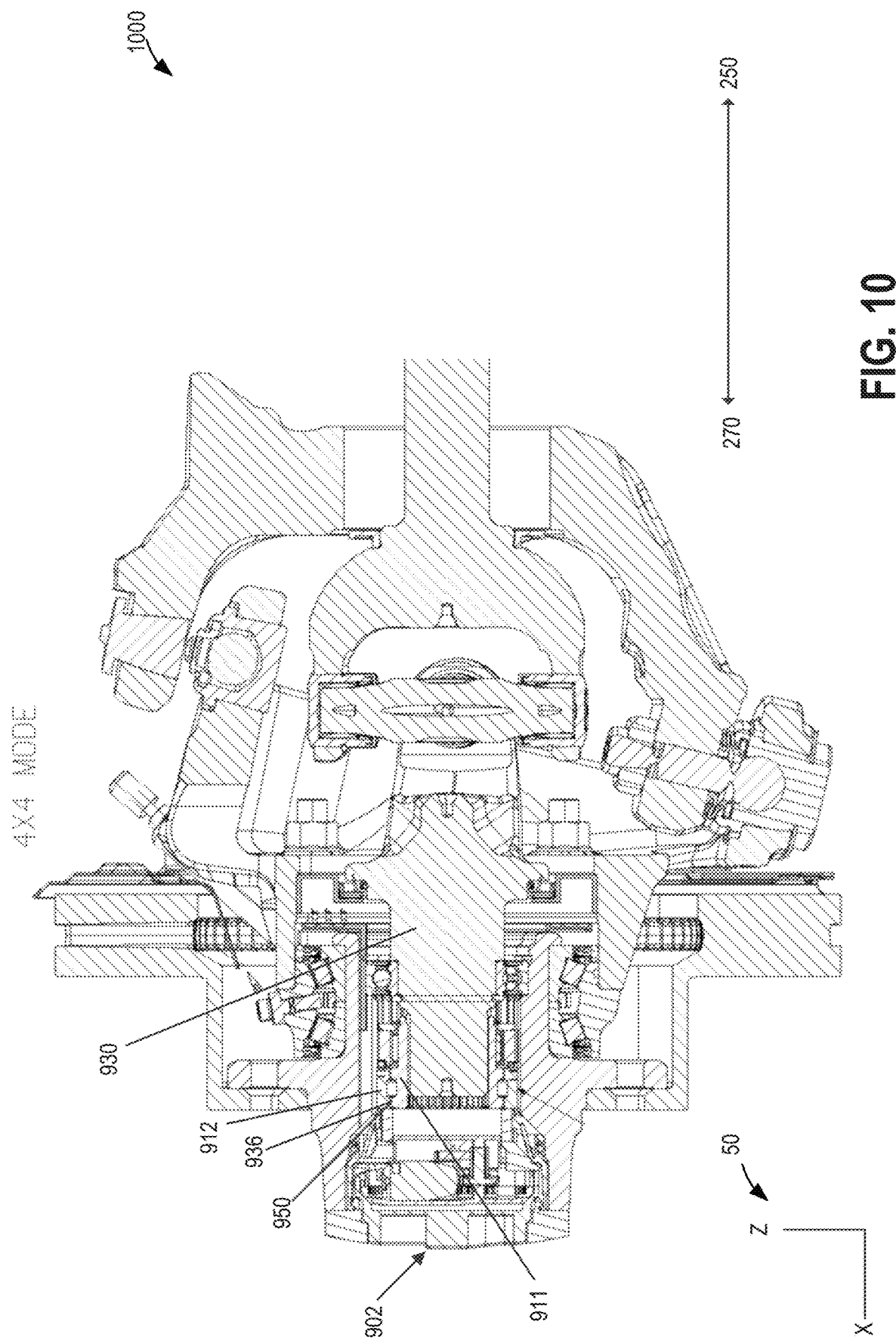
FIG. 10 shows an example cross section of an axle hub assembly that includes an electric hub lock in four-wheel drive mode.

Turning now to FIG. 10, shows an example cross sectional view 1000 of the axle hub assembly shown in FIG. 9 that includes electric hub lock (EHL) 902. It will be appreciated that EHL 902 may be identical or similar to EHL 200 of FIG. 2 and share identical or similar components. In the depicted example, the electric hub lock 902 is actuated into a four-wheel drive configuration. In the engaged, four-wheel configuration, the first, outer spline set 950 of inner drive gear 911 aligns (e.g., meshes) with spline 936 of the clutch ring 912. As such, the rotational input from the axle shaft 930 coupled to the inner drive gear 911 may be transferred to the wheel (e.g., wheel 38 of FIG. 1) when the clutch ring 912 is in the engaged configuration. All other components included in FIG. 10 may be identical or similar to those previously described, and as such, will not be described here.

The aforementioned embodiments of an electric hub lock uses electric energy at the hub (e.g., wheel attachment interface 36 of FIG. 1) which always rotates with the wheel (e.g., wheel 38 of FIG. 1) as the vehicle (e.g., vehicle 100 of FIG. 1) is propelled. Three example methods are described herein to deliver the electrical energy from the vehicle power source (such as a vehicle battery, not shown) to the hub in order to power the electric hub lock. One example method includes the use of brushed slip rings, which will be described below in reference to FIG. 11. Another example method of delivering electrical energy to the hub is inductive slip rings, which will be described below in reference to FIG. 12. A further example includes a hub-mounted electrical energy generation and storage system. FIG. 13 shows example embodiments of electrical power and signal transmission paths for the aforementioned electrical energy delivery methods.

Figure 11:
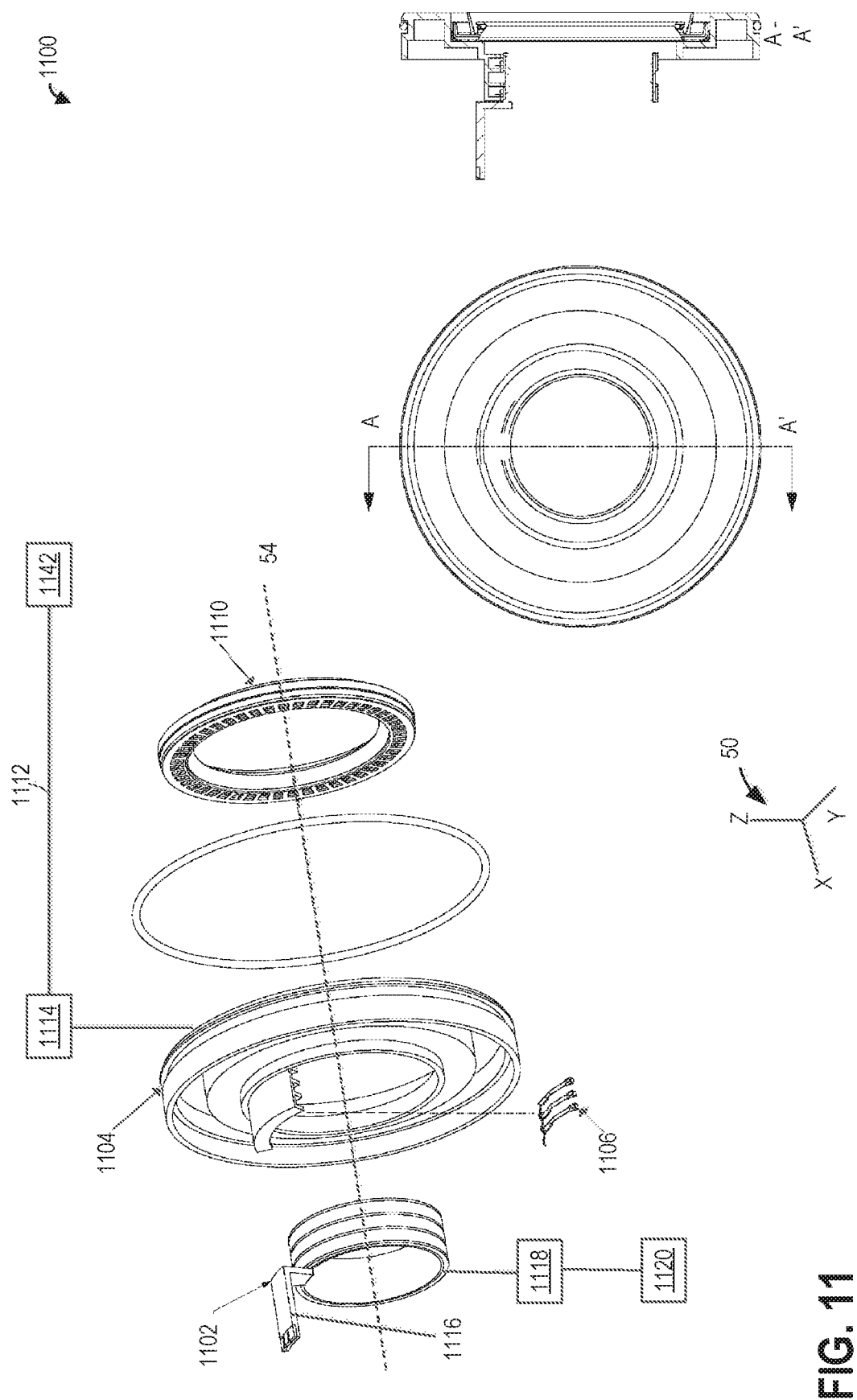
FIG. 11 shows an exploded view of an exemplary brush slip ring assembly.

Turning now to FIG. 11, it shows an exploded view of an exemplary slip ring assembly 1100, which may also be referred to as a brushed slip ring assembly. It will be appreciated that the slip ring assembly shown at 1100 may be identical or similar to the slip ring assembly 927 of FIG. 9. For reference, coordinate system 50 is shown, as well as central rotational axis 54. Brushed slip ring assembly 1100 includes a stationary brush box 1104, where the brush box 1104 may not rotate with the wheel as the wheel rotates while the vehicle is being propelled. Brushes 1106, which may be coupled to brush box 1104. The slip ring assembly 1100 may also include a brush ring 1102. Brush ring 1102 may further include a keyed feature 1116, which will be described below. The slip ring assembly 1100 may further include an axle seal 1100, which may be positioned at the coupling location between the slip ring assembly 1100 and the vehicle axle (e.g., axle shaft 930 of FIG. 9).

A vehicle controller 1142, which may be identical or similar to controller 42 of FIG. 1, may be coupled to the stationary (e.g., non-rotating) brush box 1104 via a wire harness 1112 and vehicle side connector 1114. The brush box 1104 may also include internal electrical contacts (not shown) that electrically connect, and which may also physically couple, the brushes 1106 to the brush box 1104. In this way, electrical power and signal transmission may be conveyed from vehicle controller 1142 to brushes 1106. When assembled, the brush ring 1102 may rotate about central rotational axis 54 while remaining in face-sharing contact with the non-rotating brushes 1106. The brush ring 1102 may include a keyed feature 1116 that couples the brush ring 1102 to the hub (such as wheel attachment interface 36 of FIG. 1) so that it may rotate with a vehicle wheel (such as wheel 38 of FIG. 1). The brush ring 1102 may include electrical contacts or a hub side connector 1118 between the brush ring 1102 and an electric hub lock EHL 1120, which may be identical or similar to EHL 200 of FIG. 2, EHL 902 of FIG. 9, and/or EHL 1002 of FIG. 10. In some embodiments, hub side connector 1118 may couple to an electric shift assembly of the EHL 1120, such as the electric shift assembly 220 of FIG. 2 so that power may be delivered to the motor (e.g., motor 10 of FIGS. 2 and 3) of the electric shift assembly. It will be appreciated that hub side connector 1118 may include a wiring harness, or may be directly coupled to the circuitry of the EHL 1120. In this way, electrical grounding and 12V power from the vehicle may be communicated to the EHL 1120 from controller 1142, and feedback (e.g., output) from a mode sensor (not shown), such as from mode sensor 710 of FIG. 7, may be communicated to the vehicle controller 1142.

Figure 12:
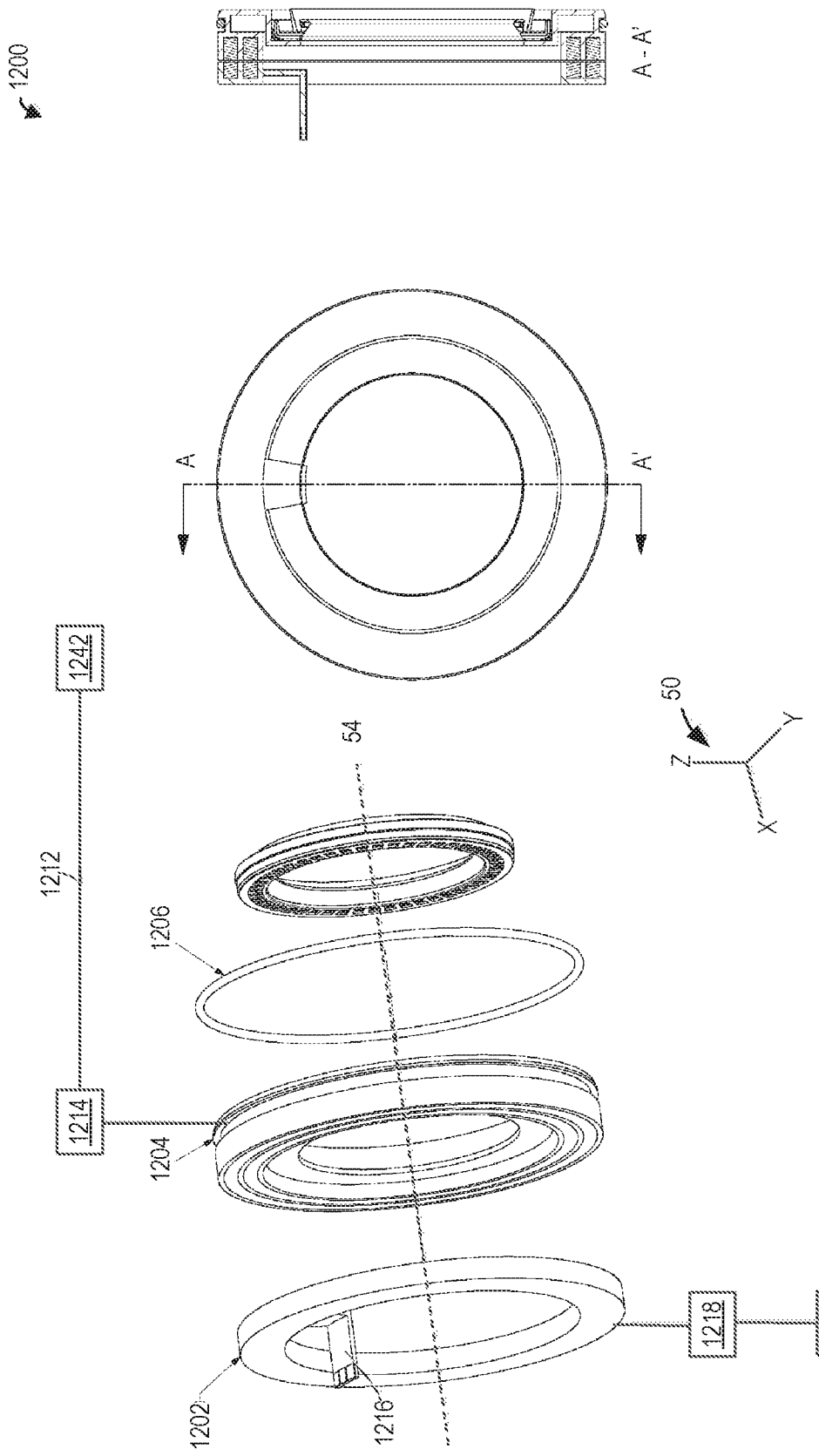
FIG. 12 shows an exploded view of an exemplary induction slip ring assembly.
Figure 13:
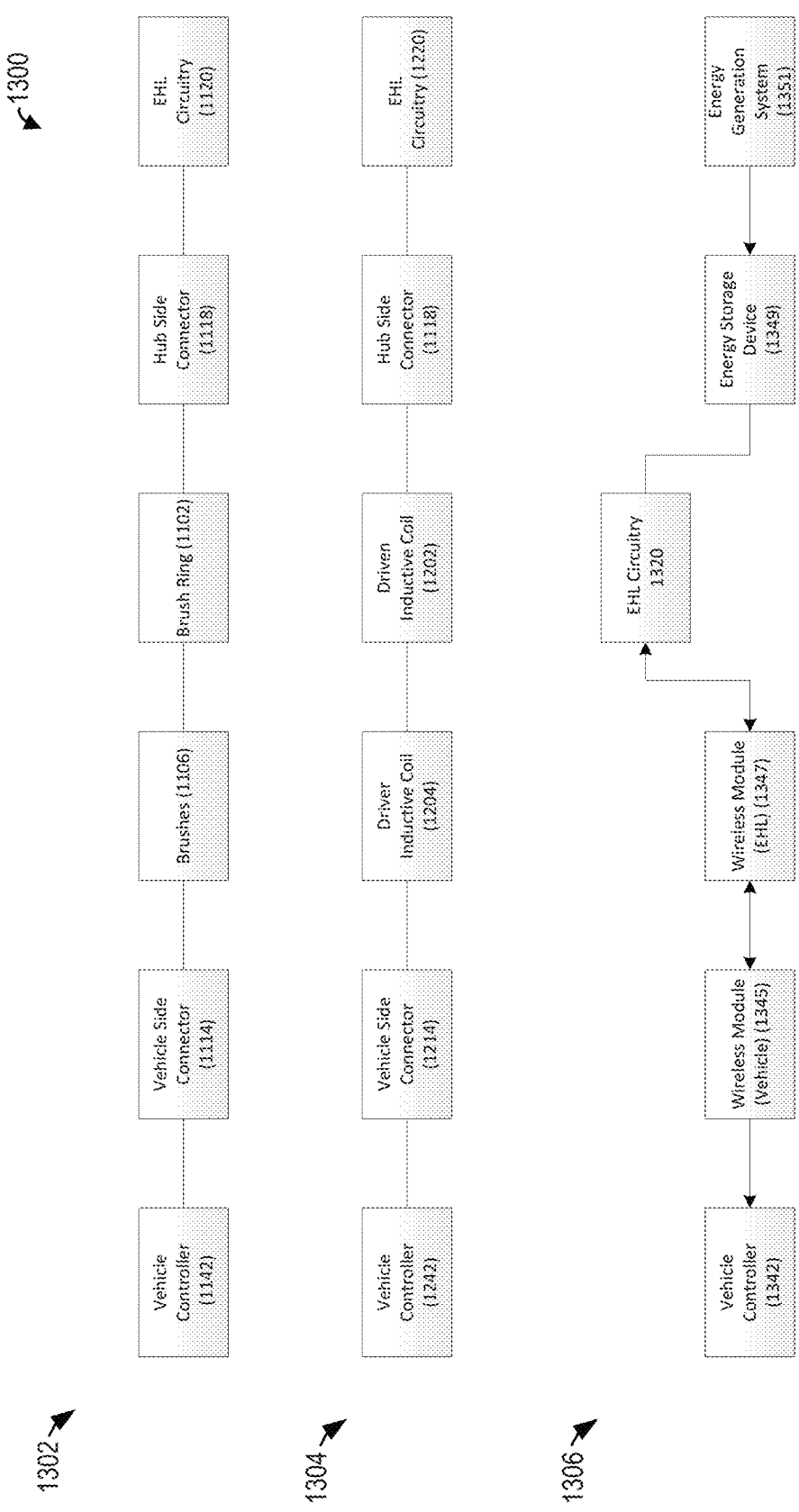
FIG. 13 shows exemplary electrical power and signal transmission paths for a slip ring assembly, an induction slip ring assembly, and a hub-mounted energy generation system and electrical energy storage system.

Turning now to FIG. 12, it shows an exploded view of an exemplary inductive slip ring assembly 1200. For reference, coordinate system 50 is shown, as well as central rotational axis 54. It will be appreciated that the inductive slip ring assembly shown at 1200 may be used in place of slip ring assembly 1100 of FIG. 11 for delivering electric power and signals to the embodiments of the electric hub lock included in this disclosure. For reference, coordinate system 50 is shown, as well as central rotational axis 54. Inductive slip ring assembly 1200 comprises a stationary driver (e.g., input) coil 1204, which does not rotate with a vehicle wheel (e.g., wheel 38 of FIG. 1) as the wheel rotates while the vehicle is being propelled. Inductive slip ring assembly also includes a driven coil 1202. A vehicle controller 1242, which may be identical or similar to controller 42 of FIG. 1, may be connected to the stationary driver coil 1204 via a wiring harness 1212 and vehicle side connector 1214. The inductive slip ring assembly 1200 operates on the principle of using the inductive properties of a coil of wire with current flowing through it. Therein, the driver coil 1204 may generate a magnetic field as a result of a current flowing through the driver coil 1204. The current flowing through the driver coil 1204 may be delivered from a vehicle power source (such as a vehicle battery, not shown). The magnetic field emanating from the driver coil 1204 may generate a current in the rotating driven coil 1202 positioned proximate the driver coil 1204. It will be appreciated that the driven coil rotates as a result of being coupled to the hub (e.g., wheel attachment interface 36 of FIG. 1) via a keyed feature 1216 and thus rotates with the wheel when it rotates. The driven coil 1202 may include electrical contacts or a hub side connector 1216 between the driven coil 1202 and an electric hub lock EHL 1220, which may be identical or similar to EHL 200 of FIG. 2, EHL 902 of FIG. 9, EHL 1002 of FIG. 10, and/or EHL 1120 of FIG. 11. It will be appreciated that hub side connector 1216 may include a wiring harness, or may be directly coupled to the circuitry of the EHL 1220. In this way, electrical grounding and 12V power from the vehicle may be communicated to the EHL 1220 from controller 1242, and feedback (e.g., output) from a mode sensor (not shown), such as from mode sensor 710 of FIG. 7, may be communicated to the vehicle controller 1242.

In an alternate embodiment, delivering electrical energy from the vehicle power source to an electric hub lock (such as any one of the aforementioned electric hub locks) may be accomplished using a hub-mounted energy generation system and electrical storage system, such as the hub-mounted energy generation and electrical storage system 48 of FIG. 1. In one example, the hub-mounted energy generation and electrical storage system 48 may power the electric hub lock using "wasted" energy at the hub. This "wasted" energy capture system may operate using the same principles as regenerative braking systems where energy in the form of one or more of heat, rotation, and vertical translation (e.g., repeated movement up and down) may be stored in an energy storage device 1349 (such as a battery, accumulator, or a capacitor) of the hub-mounted energy generation and electrical storage system 48. When a vehicle controller (e.g., control 42 of FIG. 1) sends a command to electrically actuate the electric hub lock, energy from the energy storage device 1349 may be delivered to the electric hub lock. In one embodiment, the energy may be conveyed from the energy storage device to the electric hub lock through wires or a wiring harness. Transmission of sensor feedback (such as from mode sensor 710 of FIG. 7) and command signals conveyed between the vehicle controller and the electric hub lock may be communicated using wireless communication devices positioned proximate the vehicle controller and proximate the electric hub lock, respectively, such as wireless communication devices 45 and 47 of FIG. 1. In this way, the electric hub lock and its energy source may be coupled to a rotating wheel attachment interface (e.g., wheel attachment interface 36 of FIG. 1) without an electrical wire, or other physical connection, to the non-rotating vehicle.

Turning now to FIG. 13, example embodiments of electrical power and signal transmission paths for the aforementioned configurations are shown at 1300. For all embodiments included in FIG. 13, it will be appreciated that for each configuration, the vehicle and the electric hub lock are coupled such that power (e.g., 12V) and electrical grounding may convey between them. Further, mode sensor feedback (such as from mode sensor 710 of FIG. 7) may be conveyed to the vehicle controller, such as vehicle controller 42 of FIG. 1. Additionally, command signals may be conveyed from the vehicle controller to one or more actuators, such as the electric hub lock, based on the sensor feedback.

At 1302, the electric power and signal transmission path is shown for a slip ring assembly, such as the slip ring assembly 1100 of FIG. 11. Electrical power and signal transmission from the vehicle controller 1142 communicates with the vehicle side connector 1114 before communicating the signal/power to the brush ring 1102 via brushes 1106. The signal and power is then communicated through hub side connector 1118 before delivering the signal to the electrical hub lock 1120.

At 1304, the electrical power and signal transmission path is shown for an inductive slip ring assembly, such as the inductive slip ring assembly 1200 of FIG. 12. Electrical power and signal transmission from the vehicle controller 1242 communicates with the vehicle side connector 1214 before communicating the signal/power to the driven (e.g., inductive) coil 1202 via the driver (e.g., inductive) coil 1206. The signal and power is then communicated through hub side connector 1218 before delivering the power/signal to the electrical hub lock 1220.

At 1306, the electrical power and signal transmission path is shown for a hub-mounted electrical energy generation and storage system, such as the hub-mounted electrical energy generation and storage system 48 of FIG. 1. Control signals, including control commands to actuate the electric hub lock, and sensor feedback, between the electric hub lock (EHL) 1320 from the controller 1342 may be delivered via a wireless vehicle module 1345 (identical or similar to wireless communication device 45 of FIG. 1) and a wireless EHL module or wireless hub module 1347 (identical or similar to wireless communication device 47 of FIG. 1) coupled to each wheel attachment interface (e.g., wheel attachment interface 36 of FIG. 1). In this way, the locking hub system 1320 may be controlled (e.g., actuated) via wireless commands from the controller 1342 and conveyed using wireless hub modules 1345 and 1347. Electrical power used to power the electric hub lock may be accomplished using a hub-mounted energy generation system 1351 and electrical storage device 1349. As previously described, "wasted" energy at the hub (e.g., wheel attachment interface 36 of FIG. 1) may be captured using energy generation system 1351. In one example, energy generation system 1351 may be an energy conversion device used to convert kinetic energy (which may be in the form of one or more of heat, rotation, and vertical translation) proximate a wheel assembly to a form of storable energy at an energy storage device 1349.

Responsive to a wireless command from controller 1342 to electrically actuate the electronic circuitry of hub lock 1320, an actuator on the energy storage device 1349 may be adjusted to increase the amount of power delivered to the electric hub lock and actuate the electric hub lock in the commanded position (e.g., engaged or disengaged positions). In this way, the electric hub lock and its energy source may be coupled to a rotating wheel attachment interface (e.g., wheel attachment interface 36 of FIG. 1) without an electrical wire, or other physical connection, to the non-rotating vehicle.

Figure 14:
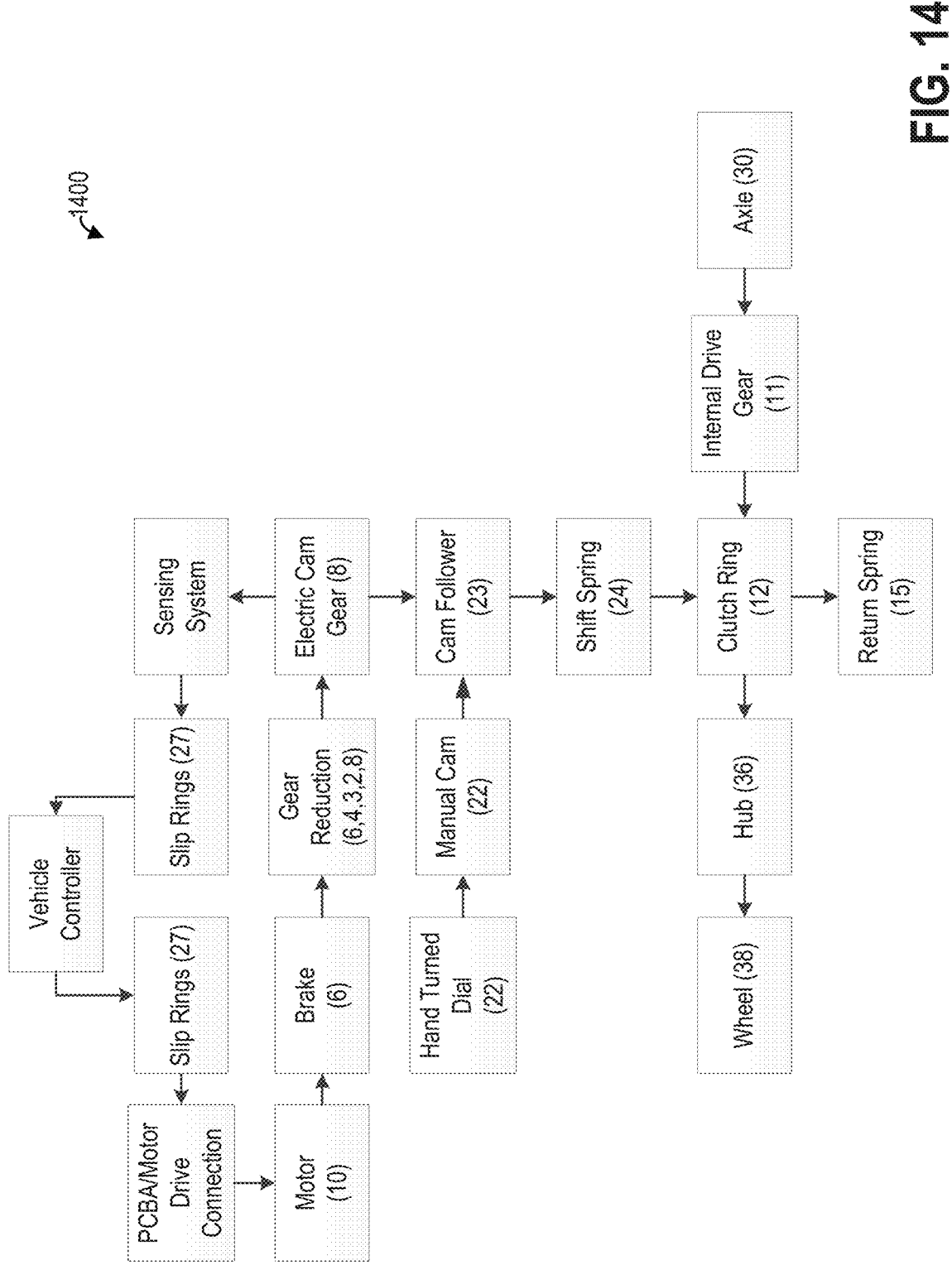
FIG. 14 shows an exemplary flow diagram of electric hub lock operation.

Turning now to FIG. 14, a block diagram 1400 showing an example of a control method for the EHL 200 of FIG. 2, the EHL 902 of FIG. 9, and EHL 1002 of FIG. 10. This control method may also apply to the embodiments EHL 1120 of FIG. 11 and EHL 1220 of FIG. 12. In one example, the electric hub lock system of FIG. 1 may be manually actuated into one of two configurations: an engaged configuration and a disengaged configuration. Therein, the dial 22 may be turned via a user's hand into a position indicative of a request to engage the EHL and move the drivetrain into a 4×4 mode. Turning of the dial 22 in the direction toward a 4×4 mode position, induces rotation of the integrated cam 406 in a first direction. Rotation of the integrated cam 406 in the first direction induces a translation of the cam follower 23 in the direction 250, as shown in FIG. 2. Translation of the cam follower 23 in the direction 250 forces the cam follower 23 to come into contact and exert a translation force against the block shift spring 24, also in the direction 52. Compression of the block shift spring 24 exerts a translational force against the clutch ring 12, overcoming the counterforce (e.g., in a direction 270) of disengagement spring 15, causing the clutch ring 12 to translate in direction 250. In the engaged configuration splines in clutch ring 12 well as the splines on the outer surface of the inner drive gear are mated to enable rotational input to be transferred from the inner drive gear 11 to the clutch ring 12. In this way, the inner drive gear 11 and the clutch ring 12 can jointly rotate. It will be appreciated that an axle provides the rotational input to the inner drive gear 11, such as the one of the axles 30, as shown in FIG. 1. As such, the rotational input from the axle coupled to the inner drive gear 11 may be transferred to the wheel (e.g., wheel 38 of FIG. 1) attached to the cap 21 when the clutch ring 12 is in the engaged configuration.

In another example, the dial 22 may be turned via a user's hand into a position indicative of a request to disengage the EHL and move the drivetrain into a 4×2 mode. Turning of the dial 22 in the direction toward an automatic mode position, induces rotation of the integrated cam 28 in a second direction. Rotation of the integrated cam 28 in the second direction induces a translation of the cam follower 23 in the direction 270, as shown in FIG. 2. Translation of the cam follower 23 in the direction 270 relieves the translational force exerted from the cam follower 23 to the block shift spring 24, in the direction 250. Relieved force on the block shift spring 24 allows the force exerted by the disengagement spring 15 (e.g., in direction 270) to overcome the reduced forced exerted by the block shift spring 24, allowing the clutch ring 12 to translate in direction 270. In the disengaged configuration splines in clutch ring 12 well and the splines on the outer surface of the inner drive gear are not mated. In one example, the internal splines of the clutch ring translate in the direction 270, moving away from the stationary splines on the external surface of the inner drive gear 11. Decoupling of the clutch ring 12 and the inner drive gear 11 prevents rotational input to be transferred from the inner drive gear 11 to the clutch ring 12. In this way, the inner drive gear 11 and the clutch ring 12 can rotate independently. It will be appreciated that an axle provides the rotational input to the inner drive gear 11, such as the one of the axles 30, as shown in FIG. 1. As such, the rotational input from the axle coupled to the inner drive gear 11 may not be transferred to the wheel (e.g., wheel 38 of FIG. 1) via the clutch ring 12 in the disengaged configuration.

Further embodiments may be configured such that the vehicle controller 42 (of FIG. 1) may selectively command the EHL into an engaged or disengaged configuration responsive to one or more of vehicle conditions, engine operating conditions, and a drivetrain conditions. One example of a drivetrain condition may include an indication of wheel slip. In such an embodiment, responsive to an indication of wheel slip (e.g., via sensor output from one of more of a vehicle speed sensor, acceleration sensor, and a wheel speed sensor), the controller may selectively actuate the EHL into the engaged, four-wheel drive mode to facilitate increased traction and vehicle handling. After the vehicle regains traction and wheel slip ceases, as may be indicated when the controller receives output signals from suitable sensors, the controller may send a command to selectively actuate the EHL back into the disengaged, two-wheel drive mode. In this way, the controller may automatically and selectively operate the vehicle in a two-wheel mode (e.g., 4×2) or a four-wheel mode (e.g., 4×4) and change between the two-wheel drive and four-wheel drive modes without receiving a command from a user, and change modes to appropriately switch between the two-wheel mode and the four-wheel mode to meet operator demands in different driving conditions.

Figure 15:
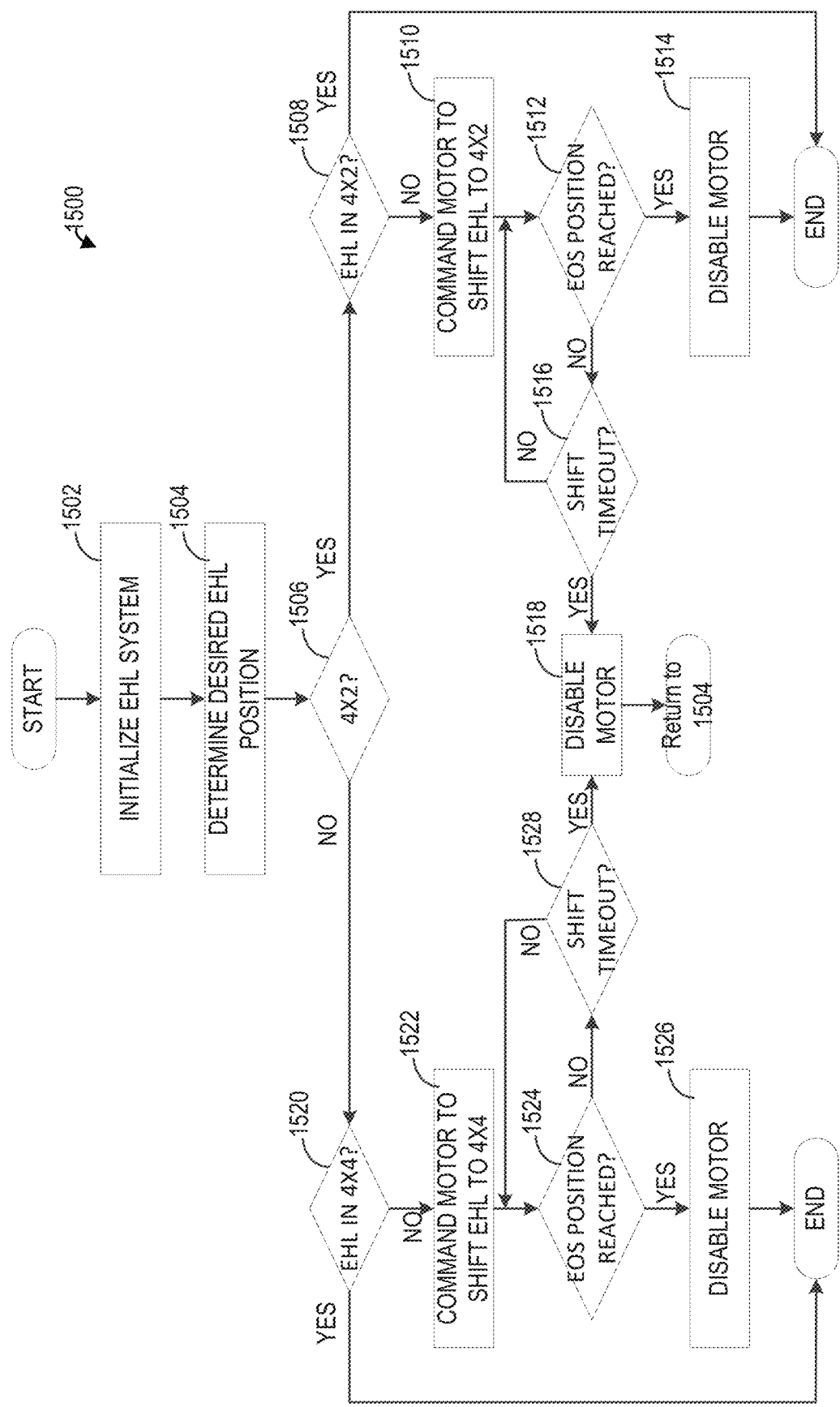
FIG. 15 shows a flow chart of a routine for automatically and selectively operating an electric hub lock to change a vehicle between a two-wheel mode and a four-wheel mode.

An example control routine 1500 for automatically and selectively operating an EHL (such as the EHL embodiments disclosed herein) to change a vehicle between the two-wheel mode (e.g., 4×2) and the four-wheel mode (e.g., 4×4), as described above, via a controller (e.g., controller 42 shown in FIG. 1) is shown in FIG. 15. Instructions for executing routine 1500 may be executed by a controller (e.g., vehicle controller 42 of FIG. 1) based on instructions stored on a memory of the controller and in conjunction with signals received from sensors of the EHL and/or vehicle system, such as the sensors described herein with reference to FIGS. 1-14. The controller may actuator actuators of the EHL to adjust a configuration of the EHL and shift between the 4×2 and 2×2 modes.

Routine 1500 starts at 1502 by initializing the EHL systems. At 1504, the routine includes determining the desired position of the EHL (4×2 or 4×4) based on one or more vehicle conditions, engine operating conditions, and a drivetrain conditions, as described above. At 1506, the routine includes determining whether the desired position is the 4×2 (two-wheel drive) position. If the desired position is the 4×2 position, the routine continues to 1508 to determine whether the EHL is already in the 4×2 position. At 1508, the routine includes checking the current position or state of the EHL (via a position sensor, as described above). If the EHL is not already in the 4×2 position (and thus is instead in the 4×4 position), the routine continues to 1510 to send a 4×2 command to the motor to enable (e.g., turn on) the motor and shift the EHL into the 4×2 position. Specifically, the controller may send an actuating signal to the motor of the EHL to turn on the motor and actuator the motor to rotate and shift the EHL from the 4×4 position to the 4×2 position, as described above.

At 1512, the routine includes determining whether the end-of-shift (EOS) position has been reached. The EOS position may include the components of the EHL completing their rotation and reaching the final 4×2 position (e.g., position shown at 802 of FIG. 8). The controller may determine that the EOS position has been reached in response to receiving a signal from the position sensor of the EHL indicating the final 4×2 has been reached. If the EOS position has been reached, the method continues to 1514 to disable the motor of the EHL. As one example, the motor may be dynamically braked to stop the shift assembly of the EHL. Alternatively at 1512, if the EOS position has not been reached, the routine proceeds to 1516 to determine whether a shift timeout has occurred. A shift timeout may occur responsive to one or more user inputs, vehicle operating conditions, and/or engine operating conditions. If no shift timeout occurred, the routine returns to 1512. However, if a shift timeout did occur, the routine proceeds to 1518 to disable the motor. The routine then returns to 1504 to read a new commanded (e.g., desired) EHL position.

Returning to 1506, if the desired EHL position is not the 4×2 position (and thus the desired shift command is the 4×4 position), the routine proceeds to 1520. At 1520, the routine includes determining whether the EHL is already in the 4×4 position. At 1520, the routine includes checking the current position or state of the EHL (via a position sensor, as described above). If the EHL is not already in the 4×4 position (and thus is instead in the 4×2 position), the routine continues to 1522 to send a 4×4 command to the motor to enable (e.g., turn on) the motor and shift the EHL into the 4×4 position. Specifically, the controller may send an actuating signal to the motor of the EHL to turn on the motor and actuator the motor to rotate and shift the EHL from the 4×2 position to the 4×4 position, as described above.

At 1524, the routine includes determining whether the end-of-shift (EOS) position has been reached. The EOS position may include the components of the EHL completing their rotation and reaching the final 4×4 position (e.g., position shown at 804 of FIG. 8). The controller may determine that the EOS position has been reached in response to receiving a signal from the position sensor of the EHL indicating the final 4×4 has been reached. If the EOS position has been reached, the method continues to 1526 to disable the motor of the EHL. As one example, the motor may be dynamically braked to stop the shift assembly of the EHL. Alternatively at 1524, if the EOS position has not been reached, the routine proceeds to 1528 to determine whether a shift timeout has occurred. A shift timeout may occur responsive to one or more user inputs, vehicle operating conditions, and/or engine operating conditions. If no shift timeout occurred, the routine returns to 1524. However, if a shift timeout did occur, the routine proceeds to 1518 to disable the motor. The routine then returns to 1504 to read a new commanded (e.g., desired) EHL position.

FIGS. 2-12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In another representation, a system, comprises: a vehicle having an axle shaft; and an engageable locking element coupled to the axle shaft having a first cam, and a second cam, wherein the first cam is coupled to a user dial and the second cam is coupled to an electrically actuated actuator.

In yet another representation, a locking hub system in a vehicle, comprises: an inner drive gear having an interior splined surface configured to attach to a vehicle axle; a bearing contacting and positioned around an external cylindrical surface of the inner drive gear; a bearing housing fixedly coupled to and positioned around the bearing, the bearing housing having a bearing housing exterior splined surface around a circumference of the bearing housing and configured to mate with a splined surface of a wheel attachment interface; a clutch ring including a clutch ring splined interior surface slidably moveable to mate with a drive gear splined exterior surface of the inner drive gear in an engaged configuration and slidably moveable to decouple from the inner drive gear splined exterior surface in a disengaged configuration; a manual dial including an integrated cam, the manual dial configured to actuate the clutch ring into the engaged and disengaged configurations in response to manual input; and an electric shift assembly including a cam gear and an electric motor, the electric shift assembly adapted to actuate the clutch ring into the engaged and disengaged configurations in response to an electrical input. In one example, the position of the clutch ring relative to the inner drive gear is axially shifted in response to the manual input. In another example, the position of the clutch ring relative to the inner drive gear is axially shifted in response to the electrical input. In yet another example, the electric shift assembly is at least partially nested within the manual dial and wherein the electric shift assembly is positioned inward of the manual dial relative to vehicle axle, along a rotational axis of the locking hub system.

In still another representation, a system for a wheel hub comprises: a first cam and a second cam, the first cam coupled to a manual actuation element, the second cam coupled to an electric actuation element, where the first and second cams are each adapted to interface with a cam follower, the cam follower in contact with a clutch ring via a block shift spring. In one example, the clutch ring is selectively positioned in an engaged position or a disengaged position with an inner drive gear, the inner drive gear adapted to couple to a vehicle axle; and/or the clutch ring is rotationally coupled to the inner drive gear when the clutch ring is positioned in an engaged position; and/or the clutch ring is rotationally decoupled from the inner drive gear when the clutch ring is positioned in a disengaged position. In yet another example, the clutch ring is slidable, along a rotational axis of the first cam and second cam, into a position where the clutch ring is engaged with an inner drive gear, the inner drive gear coupled to a wheel axle of a vehicle in which the system is installed, via sliding movement of the first cam or the second cam toward and against the clutch ring.

In another representation, a method for controlling a hub lock of a wheel, comprises: receiving a user turning action via a manual dial and rotating a first cam to lock the hub lock to rotationally engage an axle with the wheel, while a second cam is maintained fixed, the second cam coupled to an electronic actuator controlled by a signal; receiving an electronic signal and rotating the second cam to lock the hub without any user turning of the dial and the dial being maintained fixed to lock and unlock the hub; and receiving the user turning action via the manual dial and rotating the first cam which does not change the already locked hub when the second cam is maintained in a position that locks the hub. In one example, rotating the first cam to lock the hub lock while the second cam is maintained fixed includes rotating the first cam to rotate a ramped surface of the first cam along a cam of a cam follower, the cam follower positioned against a clutch ring, and in response, moving the cam follower in a first direction along a first axis to move the clutch ring in the first direction and engage the clutch ring with an inner drive gear coupled to a vehicle axle. In another example, rotating the second cam to lock the hub while the manual dial is maintained fixed includes actuating a motor to drive one or more gears to rotate the second cam, where rotation of the second cam rotates a ramped surface of the second cam along a cam of a cam follower, the cam follower positioned against a clutch ring, and in response, moving the cam follower in the a first direction along the a first axis to move the clutch ring in the first direction and engage the clutch ring with the an inner drive gear coupled to the vehicle axle. In yet another example, receiving the electronic signal includes receiving the electronic signal at the motor from the controller via a brushed slip ring assembly. The method may further comprise wherein receiving the electronic signal includes receiving the electronic signal at the motor from the controller via an inductive slip ring assembly. The may additionally or alternatively comprise wherein receiving the electronic signal includes receiving a wireless signal at the motor from the controller via a wireless communication device.

It will be appreciated that the configurations disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hub lock, comprising:
an electronically-controlled actuator adapted to engage and disengage a clutch ring and an inner drive gear of the hub lock; and
a manually-adjustable input element adapted to override a disengaged configuration of the electronically-controlled actuator and engage the clutch ring and inner drive gear hub lock,
wherein the electronically-controlled actuator is nested at least partially within the manually-adjustable input element.

2. The hub lock of claim 1, wherein the electronically-controlled actuator rotates about a central rotational axis in a first direction only and the manually-adjustable input element rotates about the central rotational axis in the first direction and a second direction, the second direction opposite the first direction.

3. The hub lock of claim 1, wherein the manually-adjustable input element comprises a manual dial including an integrated cam, wherein the electronically-controlled actuator includes a cam gear, and wherein the integrated cam is positioned outside of the cam gear relative to a central rotational axis of the hub lock.

4. The hub lock of claim 1, wherein the electronically-controlled actuator is electrically coupled to and is adapted to receive an electrical actuation signal from a brushed slip ring assembly, the brushed slip ring assembly comprising a brush box including brushes and a brush ring, wherein the brush ring is positioned concentrically within the brush box and configured to rotate with a wheel of a vehicle while the brush box does not rotate with the wheel, and wherein the electronically-controlled actuator receives power and electrical grounding from the brushed slip ring assembly.

5. The hub lock of claim 1, wherein the electronically-controlled actuator is electrically coupled to and is adapted to receive an electrical actuation signal from an inductive slip ring assembly, the inductive slip ring assembly comprising a driver coil and a driven coil, the driven coil positioned concentrically within the driver coil and configured to rotate with a wheel of a vehicle while the driver coil of the vehicle does not rotate with the wheel, and wherein the electronically-controlled actuator receives power and electrical grounding via the inductive slip ring assembly.

6. The hub lock of claim 1, wherein the electronically-controlled actuator is electrically coupled to and is adapted to receive an electrical actuation signal from an energy generation and electrical energy storage system, the energy generation and electrical energy storage system comprising a hub-mounted electric energy conversion device used to convert kinetic energy proximate to a wheel assembly to a form of storable energy at an energy storage device of the electrical energy storage system.

7. The hub lock of claim 1, wherein the electronically-controlled actuator is adapted to receive an actuation signal from a wireless communication device.

8. The hub lock of claim 1, further comprising a cam follower positioned inside of the electrically-controlled actuator and the manually-adjustable input element, wherein both the electrically-controlled actuator and the manually-adjustable input element are configured to contact an outer surface of the cam follower.

9. The hub lock of claim 8, wherein the clutch ring is in contact with the cam follower and adapted to translate axially along a central rotational axis of the hub lock responsive to a ramped surface of a cam of one of the electrically-controlled actuator or the manually-adjustable input element pushing against cams of the cam follower.

10. The hub lock of claim 1, wherein the hub lock is adjustable between an engaged position where the clutch ring and inner drive gear are engaged with one another and a disengaged position where the clutch ring and inner drive gear are disengaged from one another, wherein the hub lock is in the engaged position when the electronically-controlled actuator is in a disengaged position and the manually-adjusted input element is actuated to an engaged position, and wherein the hub lock is in the disengaged position when both the electronically-controlled actuator and the manually-adjusted input element are in their respective disengaged positions.

11. A method for controlling a hub lock of a wheel of a vehicle, comprising:

in response to receiving a first electronic signal requesting to shift the hub lock into a disengaged position where a clutch ring and inner drive gear of the hub lock are disengaged with one another, the inner drive gear coupled to an axle of the vehicle, rotating a first cam coupled to an electronic actuator of the hub lock to engage a lower profile contact point of a ramped surface of the first cam with cams of a cam follower of the hub lock, where the cam follower is adapted to engage the clutch ring; and maintaining the lower profile contact point of the ramped surface of the first cam in engagement with the cams of the cam follower, even when a higher profile contact point of a ramped surface of a second cam of a manual dial of the hub lock is engaged with the cams of the cam follower and moves the clutch ring into engagements with the inner drive gear, the second cam at least partially surrounding the first cam.

12. The method of claim 11, further comprising, in response to receiving a second electronic signal requesting to shift the hub lock into an engaged position where the clutch ring and inner drive gear are engaged with one another, rotating the first cam to engage a higher profile contact point of the ramped surface of the first cam with the cams of the cam follower.

13. The method of claim 11, wherein rotating the first cam in response to receiving the first electronic signal includes actuating a motor of the electronic actuator and disabling the motor in response to the first cam reaching an end of shift position.

14. The method of claim 13, further comprising determining the end of shift positon has been reached in response to an output of a position sensor coupled to the hub lock.

15. The method of claim 11, wherein receiving the first electronic signal includes receiving the first electronic signal at a motor of the electronic actuator from a controller of the vehicle via a brushed slip ring assembly.

16. The method of claim 11, wherein receiving the first electronic signal includes receiving the first electronic signal at a motor of the electronic actuator from a controller of the vehicle via an inductive slip ring assembly.

17. A hub lock, comprising:
a manual dial including an integrated cam;
an electric shift assembly at least partially nested within the manual dial and including a cam gear and a motor adapted to rotate the cam gear in response to receiving an electrical signal;
a cam follower positioned inside of the manual dial and electric shift assembly and including a plurality of cams adapted to interface with one or both of a first ramped surface of the integrated cam and a second ramped surface of the cam gear; and
a clutch ring assembly including a clutch ring and inner drive gear, where the clutch ring is movable, axially along a rotational axis of the hub lock, to engage with the inner drive gear via sliding input from the cam follower.

18. The hub lock of claim 17, wherein the clutch ring is movable in a first direction to engage with the inner drive gear and wherein the clutch ring is movable in an opposite, second direction, axially along the rotational axis, to disengage the drive gear.

19. The hub lock of claim 17, further comprising a block shift spring positioned between and contacting each of the cam follower and clutch ring, wherein axial movement, along the rotational axis, of the cam follower is transferred to the clutch ring via the block shift spring.

* * * * *